US010839565B1

(12) United States Patent
Park et al.

(10) Patent No.: US 10,839,565 B1
(45) Date of Patent: Nov. 17, 2020

(54) DECODING APPARATUS AND OPERATING METHOD OF THE SAME, AND ARTIFICIAL INTELLIGENCE (AI) UP-SCALING APPARATUS AND OPERATING METHOD OF THE SAME

(71) Applicant: SAMSUNG ELECTRONICS CO., LTD., Suwon-si (KR)

(72) Inventors: Youngo Park, Suwon-si (KR); Kwangpyo Choi, Suwon-si (KR); Yumi Sohn, Suwon-si (KR); Sungchan Kim, Suwon-si (KR); Myungjin Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/831,238

(22) Filed: Mar. 26, 2020

(30) Foreign Application Priority Data

Aug. 19, 2019 (KR) .................. 10-2019-0101323
Oct. 25, 2019 (KR) .................. 10-2019-0134113

(51) Int. Cl.
*G06T 9/00* (2006.01)
*G06T 3/40* (2006.01)
(Continued)

(52) U.S. Cl.
CPC ............ *G06T 9/002* (2013.01); *G06N 3/08* (2013.01); *G06T 3/4046* (2013.01); *H04N 19/85* (2014.11);
(Continued)

(58) Field of Classification Search
CPC ....... H04N 19/85; G06T 9/002; G06T 3/4046; G06T 2207/20081; G06T 2207/20084;
(Continued)

(56) References Cited

U.S. PATENT DOCUMENTS 9,398,065 B2    7/2016 Kambhatla
9,779,687 B2   10/2017 Park et al.
(Continued)

FOREIGN PATENT DOCUMENTS

KR   10-2013-0070566 A    6/2013
KR   10-2016-0133475 A   11/2016
KR   10-2018-0127782 A   11/2018

OTHER PUBLICATIONS

Afonso, Mariana, Fan Zhang, and David R. Bull. "Spatial resolution adaptation framework for video compression." Applications of Digital Image Processing XLI. vol. 10752. International Society for Optics and Photonics, 2018. (Year: 2018).*
(Continued)

*Primary Examiner* — Geoffrey E Summers
(74) *Attorney, Agent, or Firm* — Sughrue Mion, PLLC

(57) ABSTRACT

Provided is a decoding apparatus including: a communication interface configured to receive AI encoding data generated as a result of artificial intelligence (AI) down-scaling and first encoding of an original image; a processor configured to divide the AI encoding data into image data and AI data; and an input/output (I/O) device, wherein the processor is further configured to: obtain a second image by performing first decoding on a first image obtained by performing AI down-scaling on the original image, based on the image data; and control the I/O device to transmit the second image and the AI data to an external apparatus. In some embodiments, the external apparatus performs an AI upscaling of the second image using the AI data, and displays the resulting third image.

22 Claims, 26 Drawing Sheets

(51) Int. Cl.
*G06N 3/08* (2006.01)
*H04N 19/85* (2014.01)

(52) U.S. Cl.
CPC ............... *G06T 2207/20081* (2013.01); *G06T 2207/20084* (2013.01)

(58) Field of Classification Search
CPC .. G06N 3/08; G06N 3/02; G06N 3/04; G06N 3/06
USPC ........................................ 382/156, 157, 158
See application file for complete search history.

(56) References Cited

U.S. PATENT DOCUMENTS

| | | | |
|---|---|---|---|
| 2010/0088736 A1* | 4/2010 | Besen ............... | H04N 21/4122 725/119 |
| 2012/0320966 A1 | 12/2012 | Guo et al. | |
| 2017/0092226 A1* | 3/2017 | Park ................ | H04N 21/43635 |
| 2018/0176570 A1 | 6/2018 | Rippel et al. | |
| 2018/0336666 A1 | 11/2018 | Kim et al. | |
| 2018/0359107 A1 | 12/2018 | Asher et al. | |
| 2019/0045168 A1 | 2/2019 | Chaudhuri et al. | |

OTHER PUBLICATIONS

Kim, Jaehwan, et al. "Dynamic frame resizing with convolutional neural network for efficient video compression." Applications of Digital Image Processing XL. vol. 10396. International Society for Optics and Photonics, 2017. (Year: 2017).*

François, Edouard, and Leon van de Kerkhof. "A single-layer HDR video coding framework with SDR compatibility." (2016): 15-10. (Year: 2016).*

"High-Definition Multimedia Interface", Specification Version 2.0a, Mar. 19, 2015, p. 1-247.

Sung-Chun Jang et al., "High-Speed Display Interface Technology", The Korean Information Display Society, 2011, vol. 12, No. 2, p. 49-54, 12 pages total, English Translation.

Understanding of Extended Display Identification Data (EDID), Pro AV system technical data, NA Soft Jan. 27, 2016, 16:21, 41 pages, English Translation.

"HDMI Intel FGPA IP User Guide", UG-HDMI, https://www.intel.com/content/www/us/en/programmable/documentation/vgo1401099304599.html#vgo1401350352621, Feb. 10, 2020, 144 pages.

International Search Report and Written Opinion (PCT/ISA/210,237) issued by the International Searching Authority in International Application No. PCT/KR2020/005162, dated Jul. 27, 2020.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 16

| ai_codec_usage_main(payloadSize) { | Descriptor |
|---|---|
| ai_codec_info { | ue(v) |
| if(ai_codec_info) { | |
| ai_codec_applied_channel_info | ue(v) |
| target_bitrate | ue(v) |
| pic_width_in_org_luma_samples | ue(v) |
| pic_height_in_org_luma_samples | ue(v) |
| ai_codec_DNN_info | ue(v) |
| ai_codec_supplementary_info_flag | u(1) |
| if(ai_codec_supplementary_info_flag) { | |
| ai_codec_DNNstruct_info | ue(v) |
| genre_info | ue(v) |
| hdr_max_luminance | ue(v) |
| hdr_color_gamut | ue(v) |
| hdr_pq_type | ue(v) |
| codec_info | ue(v) |
| rate_control_type | ue(v) |
| } | |
| } | |
| } | |

FIG. 20

| Byte\Bit # | 7 | 6 | 5 | 4 | 3 | 2 | 1 | 0 |
|---|---|---|---|---|---|---|---|---|
| HB0 | Packet Type = 0×81 ||||||||
| HB1 | Version = 1 ||||||||
| HB2 | 0 | 0 | 0 | Length = Nv |||||

| Byte\Bit # | 7 | 6 | 5 | 4 | 3 | 2 | 1 | 0 |
|---|---|---|---|---|---|---|---|---|
| PB0 | Checksum ||||||||
| PB1 | IEEE OUI, Third Octet (0×D8) ||||||||
| PB2 | IEEE OUI, Second Octet (0×D8) ||||||||
| PB3 | IEEE OUI, First Octet (0×D8) ||||||||
| PB4 | Version (=1) ||||||||
| PB5 | Rsvd (0) | Rsvd (0) | Rsvd (0) | Rsvd (0) | Rsvd (0) | Rsvd (0) | Rsvd (0) | 3D Valid |
| (PB6)* | if (3D_Vaild is set(=1) then<br>3D_F_Structure |||| 3D_Additional Info_present | 3D_Disparity Data_present | 3D_Meta_present | Rsvd (0) |
| (PB7)* | if (3D_Vaild is set(=1)) and (3D_F_Structure ==0b1000..0b1111)) then<br>3D_F_Ext_Data |||| Rsvd (0) ||||
| (PB8)* | if (3D_Additionfo_present is set(=1)) then this byte contains 3D_AdditionalInfo: ||||||||
| | Rsvd (0) | Rsvd (0) | Rsvd (0) | 3D_DualView | 3D_ViewDependency || 3D Preferred2DView ||
| (PB9)* | if (3D_DisparityData_present is set(=1)) then ||||||||
| | 3D_DisparityData_version |||| 3D_DisparityData_length(J) ||||
| (PB9+1)* | 3D_DisparityData_1 ||||||||
| ⋮ | ⋮ ||||||||
| (PB9+J)* | 3D_DisparityData_J ||||||||
| (PBm)* | If(3D_Meta_present is set(=1)) then ||||||||
| | 3D_Metadata_type |||| 3D_Metadata_Length(K) ||||
| (PBm+1)* | 3D_DisparityData_1 ||||||||
| ⋮ | ⋮ ||||||||
| (PBm+K)* | 3D_Metadata_K ||||||||
| ...PB(Nv) | Rsvd (0) | Rsvd (0) | Rsvd (0) | Rsvd (0) | Rsvd (0) | Rsvd (0) | Rsvd (0) | Rsvd (0) |

DECODING APPARATUS AND OPERATING METHOD OF THE SAME, AND ARTIFICIAL INTELLIGENCE (AI) UP-SCALING APPARATUS AND OPERATING METHOD OF THE SAME

CROSS-REFERENCE TO RELATED APPLICATIONS

This application is based on and claims priority under 35 U.S.C. § 119 to Korean Patent Application No. 10-2019-0101323, filed on Aug. 19, 2019, and Korean Patent Application No. 10-2019-0134113, filed on Oct. 25, 2019, in the Korean Intellectual Property Office, the disclosures of which are incorporated by reference herein in their entirety.

BACKGROUND

1. Field

The disclosure relates to a decoding apparatus for decoding a compressed image and an operating method of the decoding apparatus, and an artificial intelligence (AI) up-scaling apparatus including a deep neural network (DNN) that up-scales an image and an operating method of the AI up-scaling apparatus.

2. Description of Related Art

An image is stored in a recording medium or transmitted through a communication channel in a form of a bitstream after being encoded by a codec conforming to a certain data compression standard, for example, the moving picture expert group (MPEG) standard.

With the development and supply of hardware capable of reproducing and storing a high resolution and high definition image, the necessity of a codec capable of effectively encoding and decoding the high resolution and high definition image is increasing.

SUMMARY

Provided are a decoding apparatus for reconstructing a compressed image and transmitting the reconstructed image and data required for artificial intelligence (AI) up-scaling of the reconstructed image to an AI up-scaling apparatus, and an operating method of the decoding apparatus.

Also, provided are an AI up-scaling apparatus for receiving an image and AI data from a decoding apparatus and AI up-scaling an image by using an up-scaling deep neural network (DNN), and an operating method of the AI up-scaling apparatus.

Additional aspects will be set forth in part in the description which follows and, in part, will be apparent from the description, or may be learned by practice of the presented embodiments of the disclosure.

Disclosed herein is a decoding apparatus including a communication interface configured to receive artificial intelligence (AI) encoding data, the AI encoding data generated by an AI down-scaling of an original image followed by a first encoding; a processor configured to divide the AI encoding data into image data and AI data; and an input/output (I/O) device, wherein the processor is further configured to: obtain a second image by performing a first decoding of the image data; and control the I/O device to transmit the second image and the AI data to an external apparatus.

In some embodiments of the decoding apparatus, the I/O device includes a high definition multimedia interface (HDMI), and the processor is further configured to transmit the second image and the AI data to the external apparatus through the HDMI.

In some embodiments of the decoding apparatus, the processor is further configured to transmit the AI data in a form of a vendor-specific infoframe (VSIF) packet.

In some embodiments of the decoding apparatus, the I/O device includes a display port (DP), and the processor is further configured to transmit the second image and the AI data to the external apparatus through the DP.

In some embodiments of the decoding apparatus, the AI data includes first information indicating that the second image has undergone AI up-scaling.

In some embodiments of the decoding apparatus, the AI data includes second information related to a deep neural network (DNN) for performing an AI up-scaling of the second image.

In some embodiments of the decoding apparatus, the AI data indicates one or more color channels to which AI upscaling is to be applied.

In some embodiments of the decoding apparatus, the AI data indicates at least one of a high dynamic range (HDR) maximum illumination, HDR color gamut, HDR PQ, HDR codec or HDR rate control.

In some embodiments of the decoding apparatus, the AI data indicates a width resolution of the original image and a height resolution of the original image.

In some embodiments of the decoding apparatus, the AI data indicates an output bit rate of the first encoding.

Also disclosed herein is an operating method of a decoding apparatus, the operating method including: receiving artificial intelligence (AI) encoding data, the AI encoding data generated by an AI down-scaling of an original image followed by a first encoding; dividing the AI encoding data into image data and AI data; obtaining a second image by performing a first decoding of the image data; and transmitting the second image and the AI data to an external apparatus through an input/output (I/O) device.

In some embodiments of the operating method, the transmitting of the second image and the AI data to the external apparatus includes transmitting the second image and the AI data to the external apparatus through a high definition multimedia interface (HDMI).

In some embodiments of the operating method, the transmitting of the second image and the AI data to the external apparatus includes transmitting the AI data in a form of a vendor-specific infoframe (VSIF) packet.

In some embodiments of the operating method, the transmitting of the second image and the AI data to the external apparatus includes transmitting the second image and the AI data to the external apparatus through a display port (DP).

In some embodiments of the operating method, the AI data includes first information indicating that the second image has undergone AI up-scaling.

In some embodiments of the operating method, the AI data includes second information related to a deep neural network (DNN) for performing an AI up-scaling of the second image.

Also disclosed herein is an artificial intelligence (AI) up-scaling apparatus including: an input/output (I/O) device including a high definition multimedia interface (HDMI), the I/O device configured to receive, through the HDMI, AI data related to an AI down-scaling using a first deep neural network (DNN), and a second image corresponding to a first image, the first image obtained by performing the AI down-scaling on an original image; a memory storing at least one instruction; and a processor configured to execute the at least one instruction stored in the memory to: obtain, based on the AI data, information about a second DNN corresponding to the first DNN; and perform an AI up-scaling of the second image by using the second DNN, wherein the I/O device is further configured to receive the AI data in a form of a vendor specific infoframe (VSIF) packet.

BRIEF DESCRIPTION OF THE DRAWINGS

The above and other aspects, features, and advantages of certain embodiments of the disclosure will be more apparent from the following description taken in conjunction with the accompanying drawings, in which:

A brief description of each drawing is provided to more fully understand the drawing recited in the present specification.

FIG. 5 is a table showing a mapping relationship between several pieces of image-related information and several pieces of DNN setting information.

FIG. 16 shows an AI codec syntax table, according to an embodiment of the disclosure;

FIG. 20 is a diagram of a header structure and content structure of a vendor-specific infoframe (VSIF), according to an embodiment of the disclosure;

DETAILED DESCRIPTION

Figure 1:
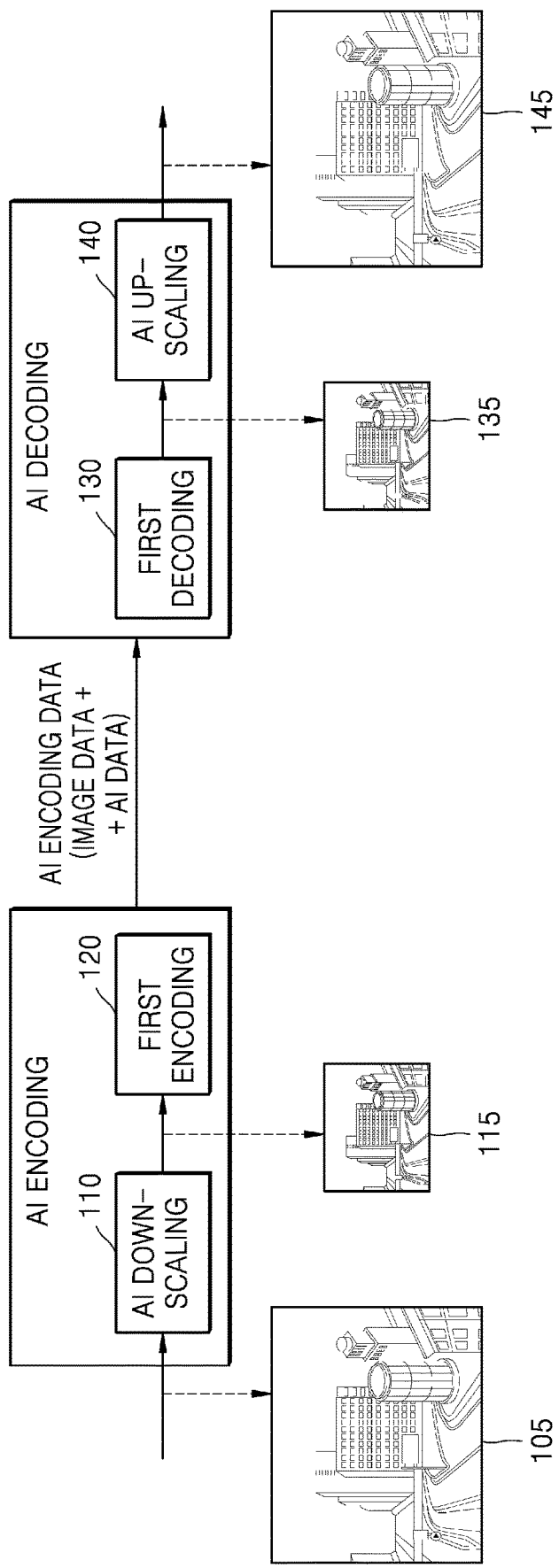
FIG. 1 is a diagram for describing an artificial intelligence (AI) encoding process and an AI decoding process, according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Throughout the disclosure, the expression "at least one of a, b or c" indicates only a, only b, only c, both a and b, both a and c, both b and c, all of a, b, and c, or variations thereof.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'IDNN setting information' includes information related to an element constituting a DNN. 'IDNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In particular, in FIG. 1, the first image 115 is obtained by performing the AI down-scaling 110 on the original image 105 and the first encoding 120 is performed on the first image 115 during the AI encoding process, according to an embodiment. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through the same network or through different networks.

Figure 2:
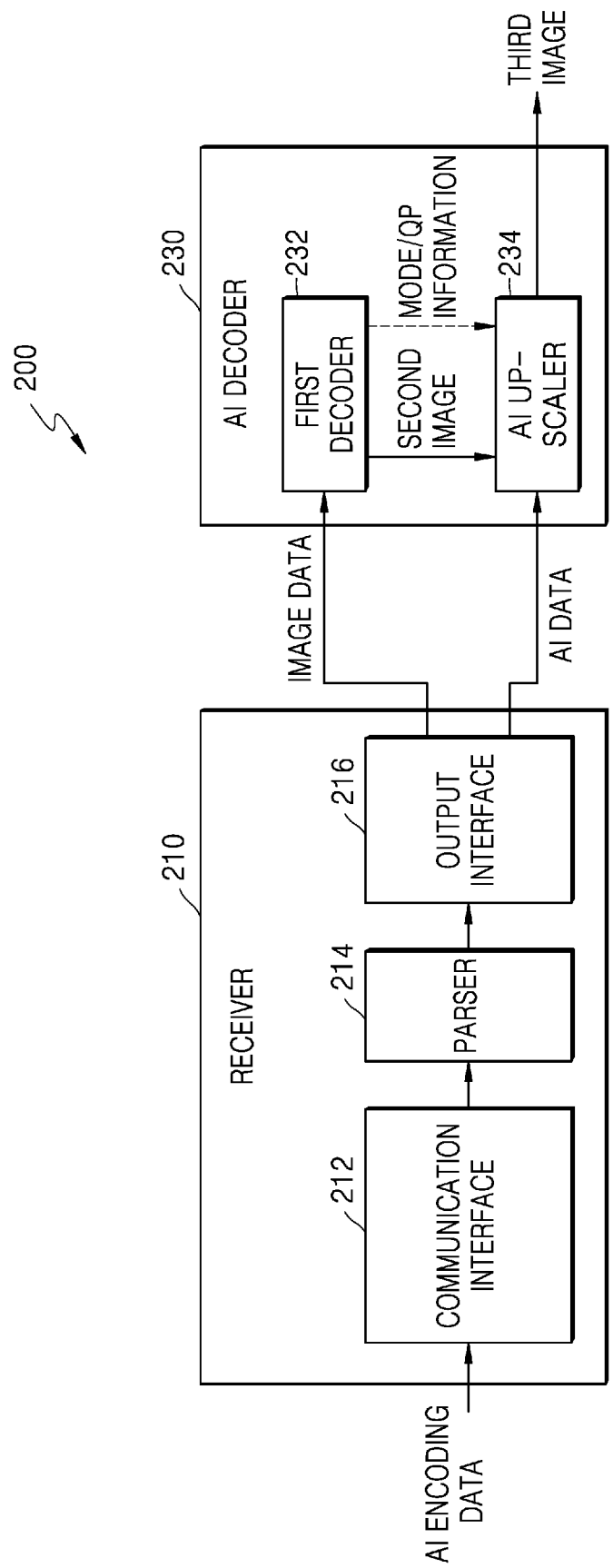
FIG. 2 is a block diagram of a configuration of an AI decoding apparatus according to an embodiment.

FIG. 2 is a block diagram of a configuration of an AI decoding apparatus 100 according to an embodiment.

Referring to FIG. 2, the AI decoding apparatus 200 according to an embodiment may include a receiver 210 and an AI decoder 230. The receiver 210 may include a communication interface 212, a parser 214, and an output interface 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In particular, the communication interface 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communication interface 212 and parses the AI encoding data to distinguish the image data and the AI data. For example, the parser 214 may distinguish the image data and the AI data by reading a header of data obtained from the communication interface 212. According to an embodiment, the parser 214 distinguishably transmits the image data and the AI data to the output interface 216 via the header of the data received through the communication interface 212, and the output interface 216 transmits the distinguished image data and AI data respectively to the first decoder 232 and the AI up-scaler 234. At this time, it may be verified that the image data included in the AI encoding data is image data generated via a certain codec (for example, MPEG-2, H.264 AVC, MPEG-4, HEVC, VC-1, VP8, VP9, or AV1). In this case, corresponding information may be transmitted to the first decoder 232 through the output interface 216 such that the image data is processed via the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
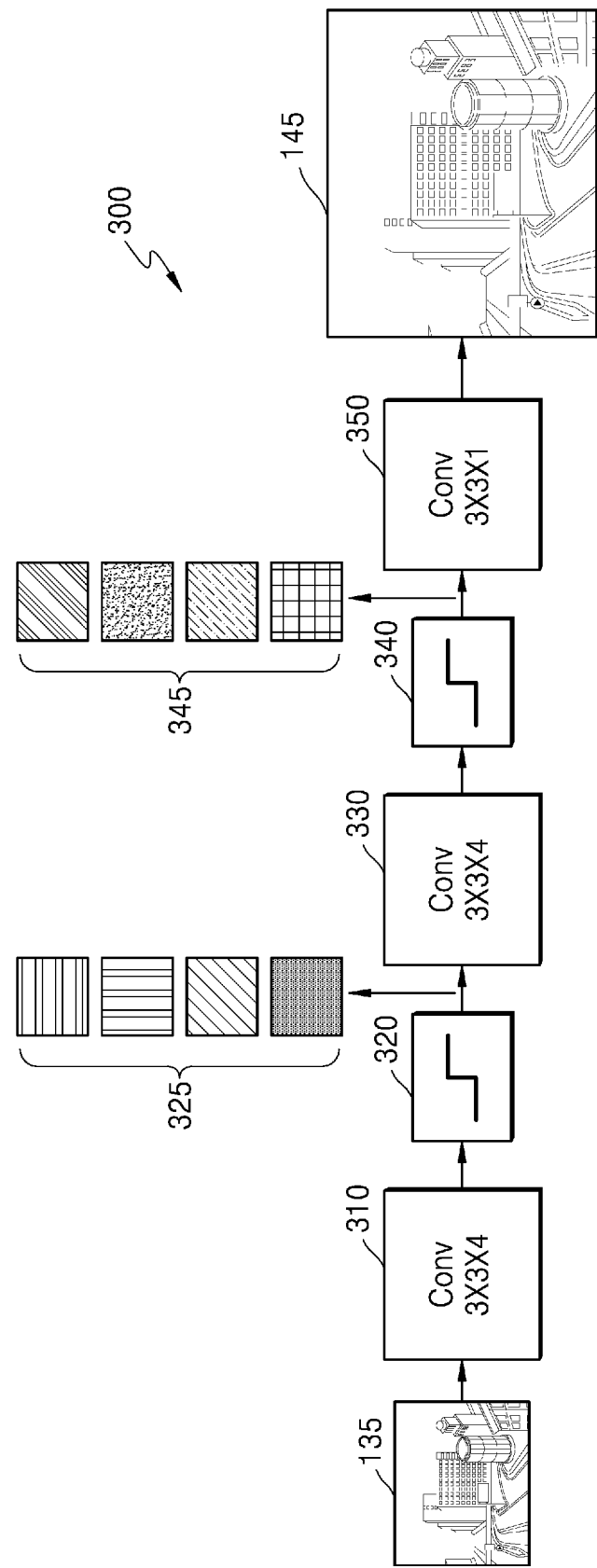
FIG. 3 is a diagram showing a second deep neural network (DNN) for performing AI up-scaling on a second image.
Figure 4:
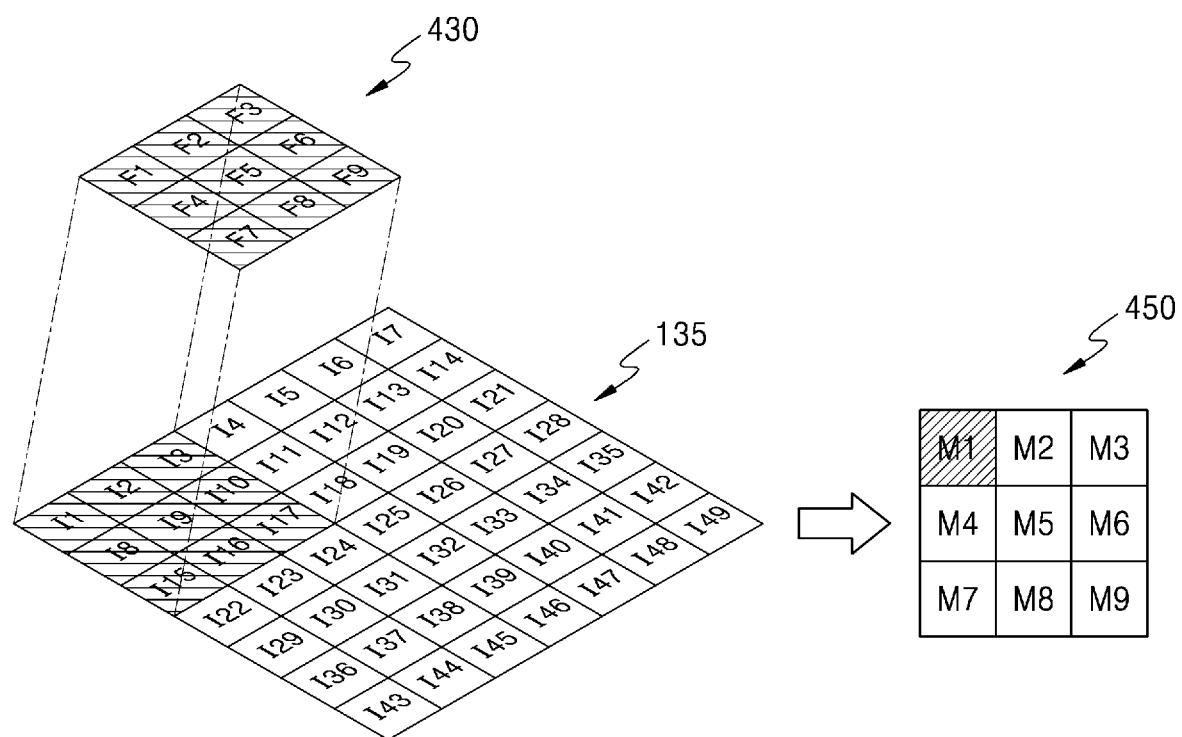
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tan h function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
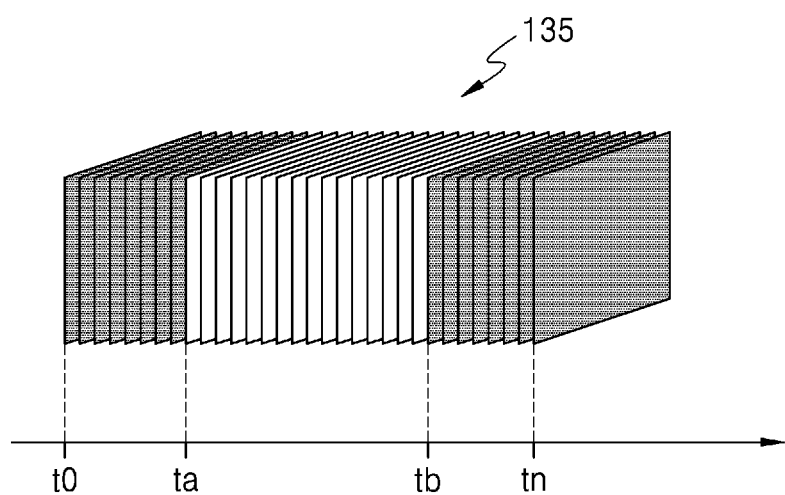
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn. For example, second image 135 includes frams t0, . . . , ta, tb, . . . , tn.

According to an embodiment, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
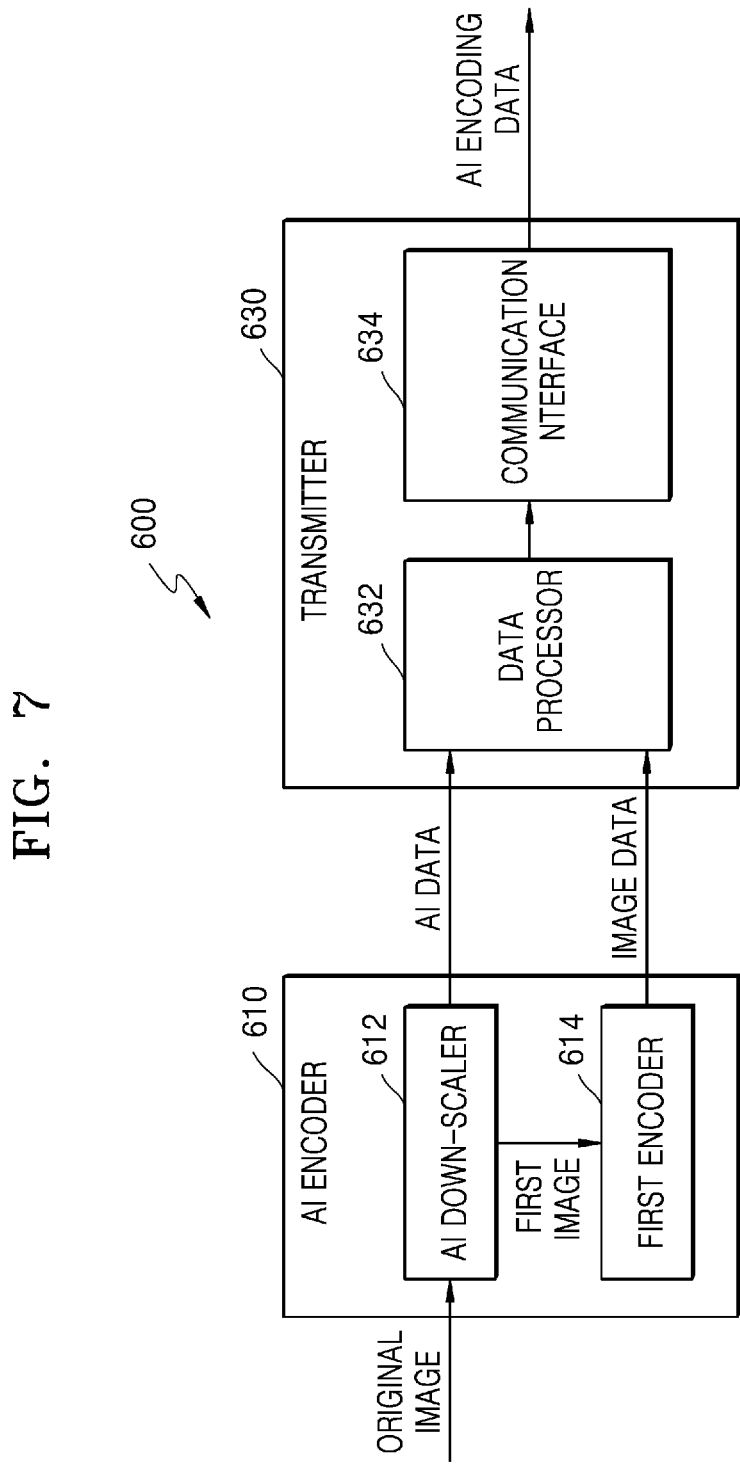
FIG. 7 is a block diagram of a configuration of an AI encoding apparatus according to an embodiment.

FIG. 7 is a block diagram of a configuration of the AI encoding apparatus 600 according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communication interface 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine down-scaling target for a certain number of frames, or may determine down-scaling target for entire frames.

According to an embodiment, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
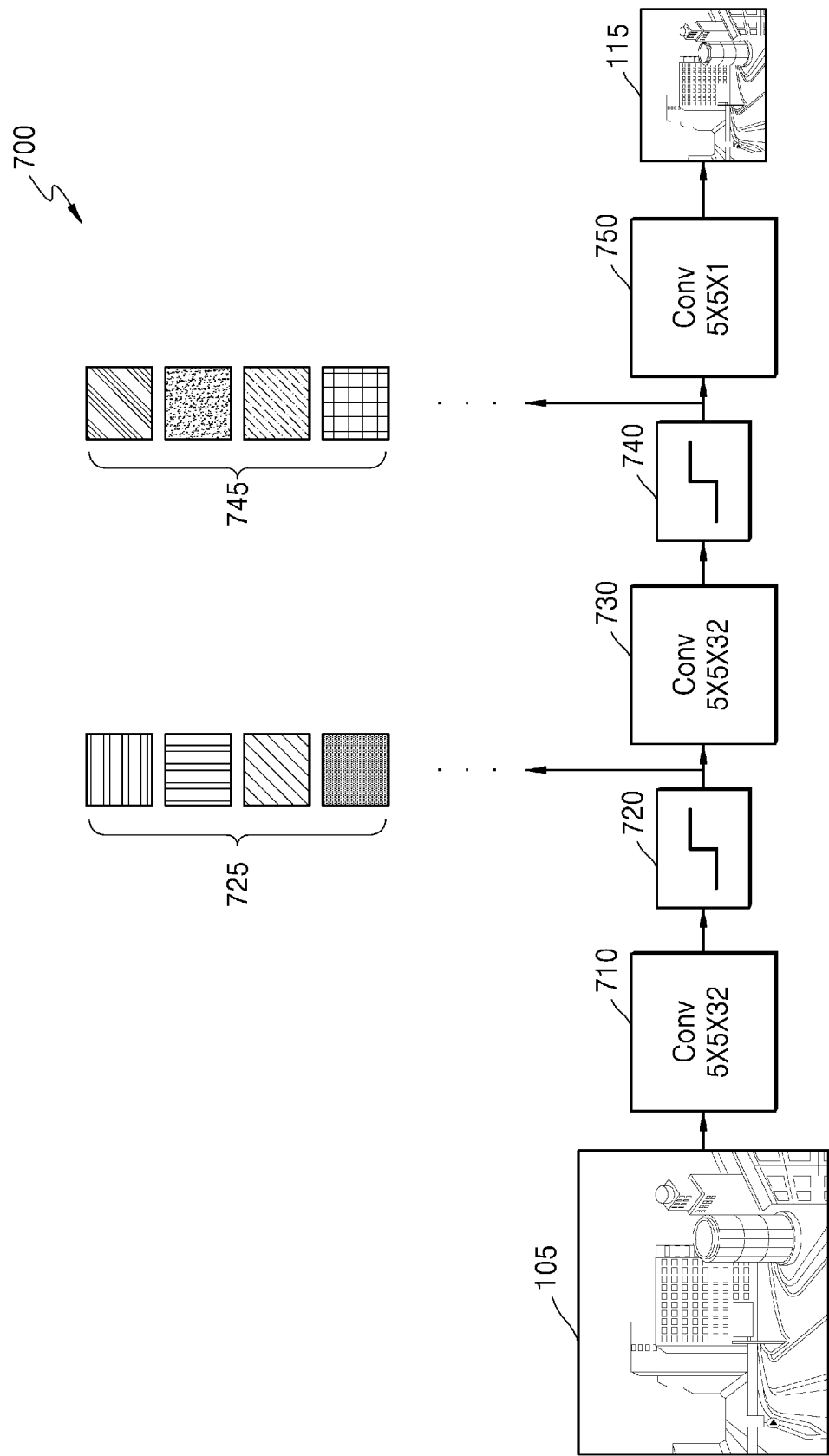
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communication interface 634. As another example, the data processor 632 may process the AI data to be expressed in a form of bitstream, and transmit each of a bitstream corresponding to the AI data and a bitstream corresponding to the image data through the communication interface 634. As another example, the data processor 632 may process the AI data to be expressed in a form of a frame or packet, and transmit the image data in a form of a bitstream and the AI data in a form of a frame or packet through the communication interface 634.

The communication interface 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
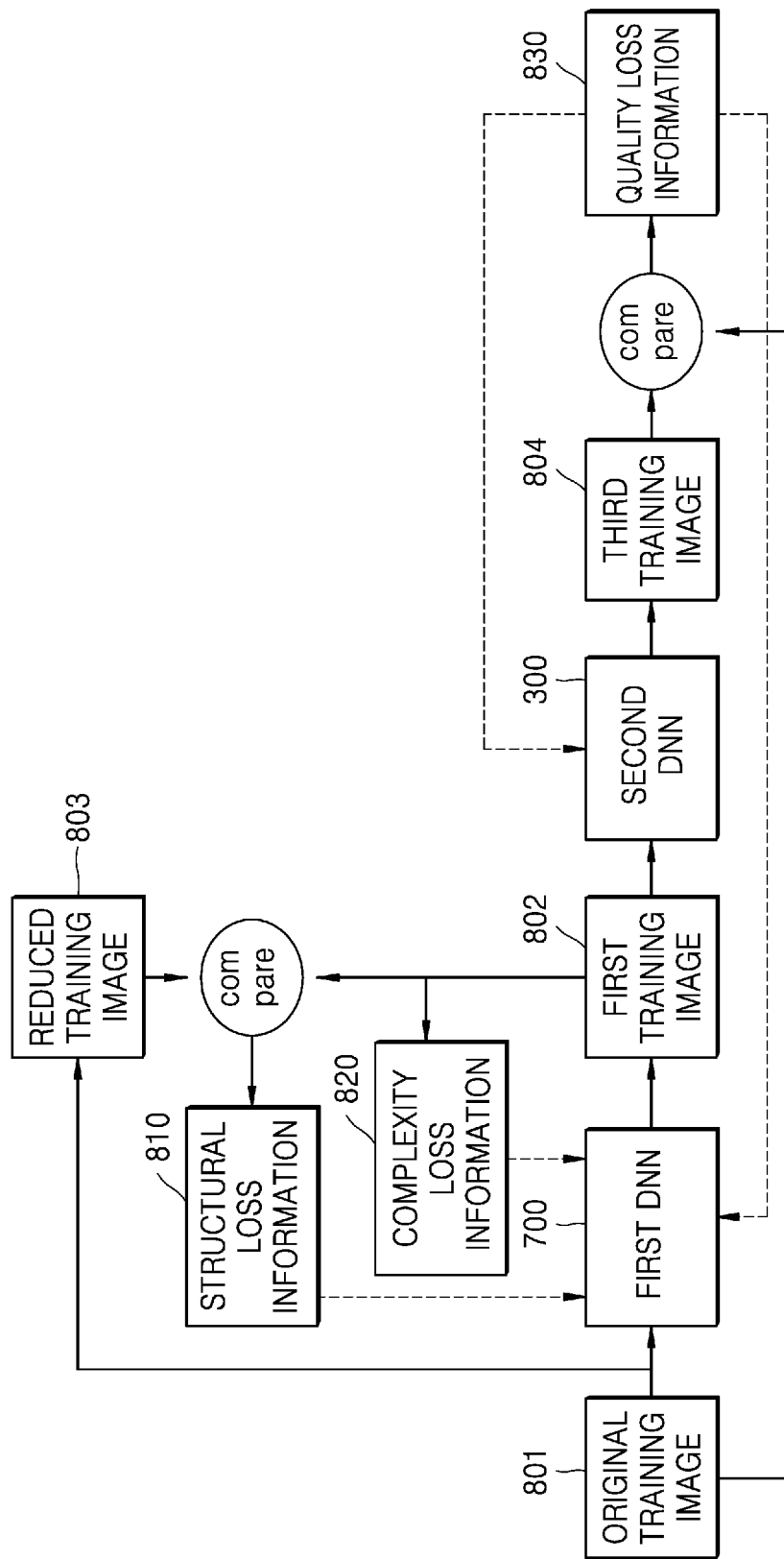
FIG. 9 is a diagram for describing a method of training a first DNN and a second DNN.

FIG. 9 is a diagram for describing a method of training the first DNN 700 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity is between the AI encoding process and the AI decoding process is required. In other words, information lost in the AI encoding process needs to be reconstructed during the AI decoding process, and in this regard, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. In particular, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 810 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{Loss}DS = a \times \text{Structural loss information} + b \times \text{Complexity loss information} + c \times \text{Quality loss information}$$

$$\text{Loss}US = d \times \text{Quality loss information} \quad [\text{Equation 1}]$$

In Equation 1, LossDS indicates final loss information to be reduced or minimized to train the first DNN 700, and LossUS indicates final loss information to be reduced or minimized to train the second DNN 300. Also, a, b, c and d may be pre-determined certain weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
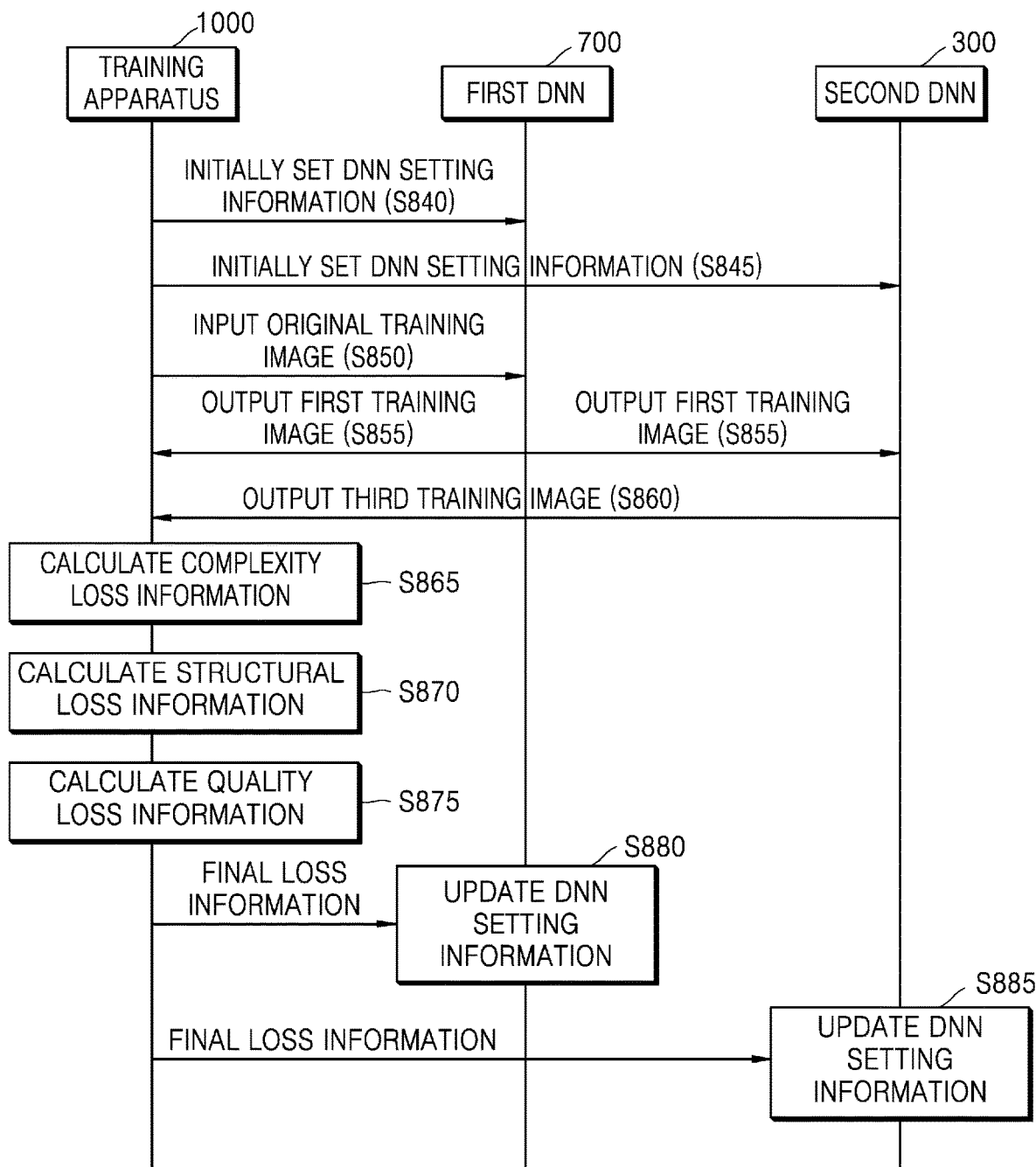
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. S855 originates from the first DNN 700. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

content including 300 frames of 8 K resolution, according to an embodiment of the disclosure, is higher than subjective image quality when encoding and decoding are performed via HEVC, a bitrate is reduced by at least 50%.

Figure 11:
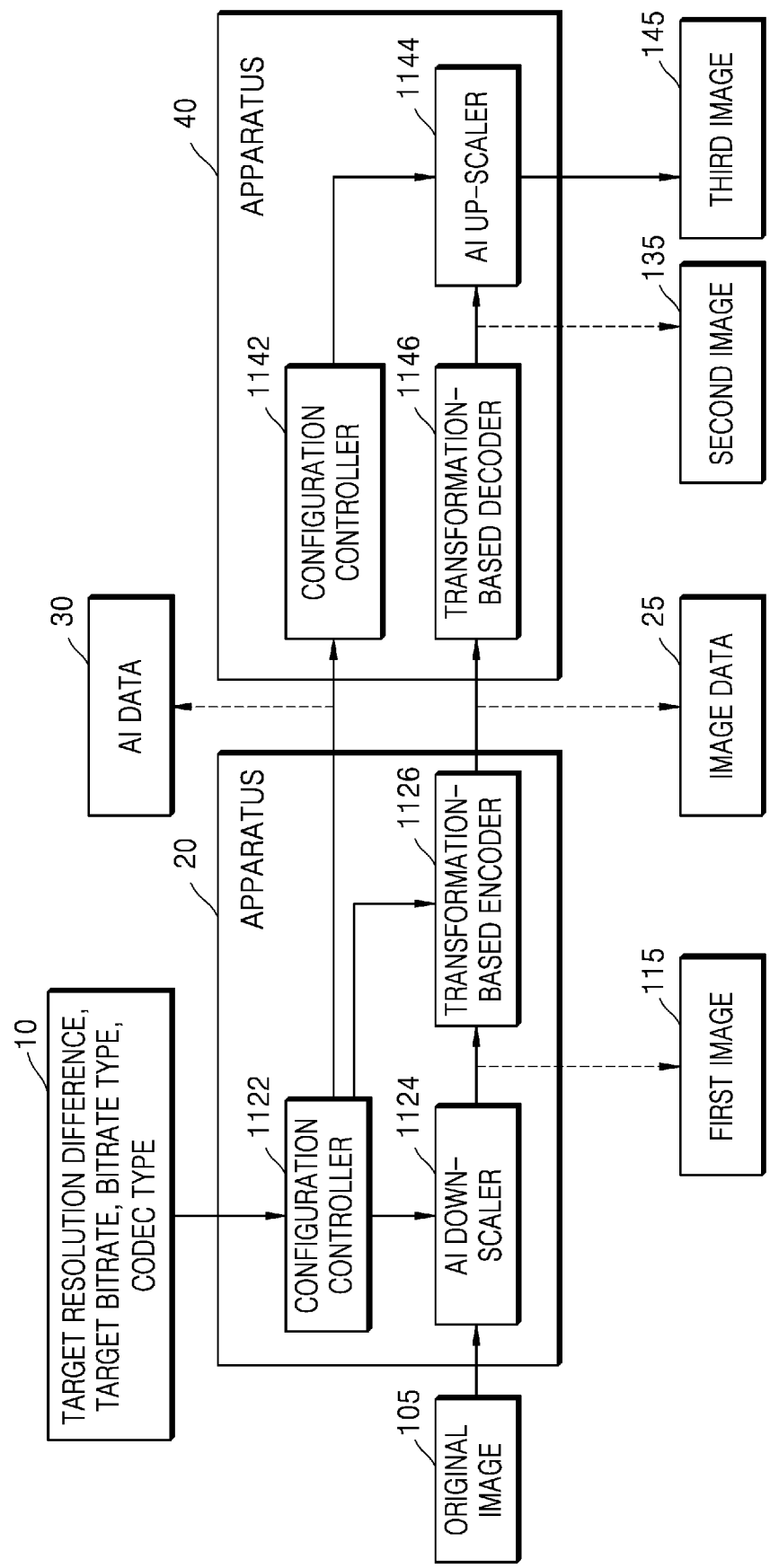
FIG. 11 is a diagram of an apparatus for performing AI down-scaling on an original image and an apparatus for performing AI up-scaling on a second image.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate

TABLE 1

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 | 46.3 | 21.4 | 94.80 | 93.54 |
| Content_02 | (7680 × 4320) | frames | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and sets the AI down-scaler 1124 with the obtained DNN setting information. According to an embodiment, the configuration controller 1122 may transmit the received input value 10 to the AI down-scaler 1124 and the AI down-scaler 1124 may obtain the DNN setting information for performing AI down-scaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and sets the AI up-scaler 1144 with the obtained DNN setting information. According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

Meanwhile, the AI decoding apparatus 200 shown in FIG. 2 may receive broadcast (for example, terrestrial broadcast, cable broadcast, or satellite broadcast) data or streaming content, perform AI decoding on the received broadcast data or streaming content, and display or externally output an AI-decoded image. However, when the streaming content is received by using a dedicated media streaming hub (for example, Firestick™ or Chromecast™) specialized for a user experience (UX) provided by a content manufacturer, the streaming hub may perform first decoding and a separate apparatus connected to the streaming hub may perform AI up-scaling of a second image on which first decoding is performed.

Accordingly, apparatuses for performing the first decoding 130 and the AI up-scaling 140 respectively and a method for connecting the apparatuses to each other and transmitting and receiving AI data required for AI up-scaling are required.

Figure 12:
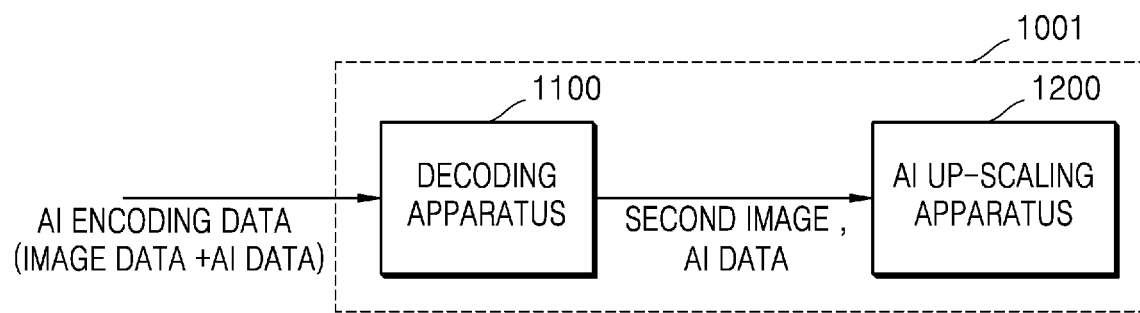
FIG. 12 is a diagram of an AI decoding system according to an embodiment of the disclosure.

FIG. 12 is a diagram of an AI decoding system 1001 according to an embodiment of the disclosure.

The AI decoding system 1001 according to an embodiment of the disclosure may include a decoding apparatus 1100 and an AI up-scaling apparatus 1200.

The decoding apparatus 1100 according to an embodiment of the disclosure may be an apparatus that receives encoded data or an encoded signal from an external source, an external server, or an external apparatus, and decodes the encoded data or signal. The decoding apparatus 1100 according to an embodiment of the disclosure may be implemented in a form of a set-top box or a dongle. However, an embodiment is not limited thereto, and the decoding apparatus 1100 may be implemented as any electronic apparatus capable of receiving multimedia data from external apparatuses.

The decoding apparatus 1100 according to an embodiment of the disclosure may receive AI encoding data and perform first decoding based on the AI encoding data. The AI encoding data is data generated as a result of AI down-scaling and first encoding of an original image, and may include image data and AI data. The decoding apparatus 1100 may reconstruct a second image corresponding to a first image via first decoding of the image data. Here, the first image may be an image obtained by performing AI down-scaling on the original image.

The first decoding according to an embodiment may include a process of generating quantized residual data by performing entropy-decoding on the image data, a process of inverse-quantizing the quantized residual data, a process of generating prediction data, and a process of reconstructing the second image by using the prediction data and the residual data. The first decoding described above may be performed via an image reconstruction method corresponding to one of image compression methods using frequency transform, such as MPEG-2, H.264, MPEG-4, HEVC, VC-1, VP8, VP9, and AV1, which are used while performing first encoding on the first image on which AI down-scaling is performed.

The decoding apparatus 1100 according to an embodiment of the disclosure may transmit the AI data included in the AI encoding data and the reconstructed second image, to the AI up-scaling apparatus 1200. Here, the decoding apparatus 1100 may transmit the second image and the AI data to the AI up-scaling apparatus 1200 via an input and output interface.

Also, the decoding apparatus 1100 may further transmit, to the AI up-scaling apparatus 1200, first decoding-related information, such as mode information and quantization parameter information included in the image data, through the input and output interface.

For example, the decoding apparatus 1100 and the AI up-scaling apparatus 1200 may be connected to each other via an HDMI cable or a display port (DP) cable, and the decoding apparatus 1100 may transmit, to the AI up-scaling apparatus 1200, the second image and the AI data through the HDMI or DP.

The AI up-scaling apparatus 1200 according to an embodiment of the disclosure may perform AI up-scaling on the second image by using the AI data received from the decoding apparatus 1100. For example, a third image may be generated by performing AI up-scaling on the second image via a second DNN.

Also, the AI up-scaling apparatus 1200 according to an embodiment of the disclosure may be implemented as an electronic apparatus including a display. For example, the AI up-scaling apparatus 1200 may be implemented as any one of various electronic apparatuses, such as a television (TV), a mobile phone, a tablet personal computer (PC), a digital camera, a camcorder, a laptop computer, a desktop computer, a compatible computer monitor, a video projector, a digital broadcast terminal, a personal digital assistant (PDA), a portable multimedia player (PMP), and a navigation device.

When the AI up-scaling apparatus 1200 according to an embodiment of the disclosure includes a display, the AI up-scaling apparatus 1200 may display the second image or the third image on the display.

Figure 13:
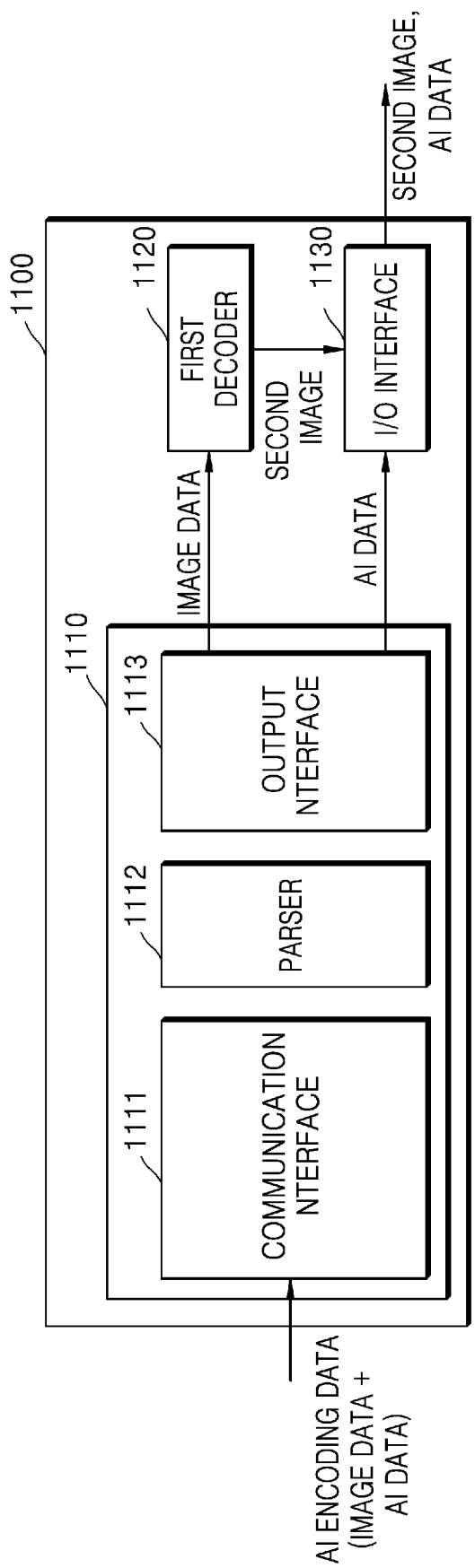
FIG. 13 is a diagram of a configuration of a decoding apparatus, according to an embodiment of the disclosure.

FIG. 13 is a diagram of a configuration of the decoding apparatus 1100, according to an embodiment of the disclosure.

Referring to FIG. 13, the decoding apparatus 1100 according to an embodiment of the disclosure may include a receiver 1110, a first decoder 1120, and an input/output (I/O) device 1130.

The receiver 1110 according to an embodiment of the disclosure may receive AI encoding data generated as a result of AI encoding. The receiver 1110 may include a communication interface 1111, a parser 1112, and an output interface 1113. The receiver 1110 receives and parses the AI encoding data generated as a result of the AI encoding, divides the AI encoding data into image data and AI data, and outputs the image data to the first decoder 1120 and the AI encoding data to the I/O interface 1130.

In particular, the communication interface 1111 receives the AI encoding data generated as the result of the AI encoding data via a network. The AI encoding data generated as the result of the AI encoding includes the image data and the AI data.

The AI data according to an embodiment of the disclosure may be received by being included in a video file together with the image data. When the AI data is included in the video file, the AI data may be included in metadata of a header of the video file.

Alternatively, when the image data on which the AI encoding is performed is received as a segment split by pre-set time units, the AI data may be included in metadata of the segment.

Alternatively, the AI data may be encoded and received by being included in a bitstream. Alternatively, the AI data may be received as a separate file.

FIG. 13 illustrates a case in which the AI data is received in a form of metadata.

The AI encoding data may be divided into the image data and the AI data. For example, the parser 1112 receives the AI encoding data through the communication interface 1111 and parses the AI encoding data to divide the AI encoding data into the image data and the AI data. For example, data received via a network may be configured in an MP4 file format conforming to the ISO base media file format standard that is widely used to store or transmit multimedia data. The MP4 file format includes a plurality of boxes, and each box may include type information indicating which data is contained and size information indicating a size of the box. Here, the data received in the MP4 file format may include a media data box in which actual media data including image data is stored and a metadata box in which metadata related to media is stored. By parsing a box type in the received data, it is determined whether the data is the image data or the AI data. For example, the parser 1112 distinguishes the image data and the AI data by identifying a box type of data in an MP4 file format received through the communication interface 1111 and transmits the image data and the AI data to the output interface 1113, and the output interface 1113 transmits the image data and the AI data respectively to the first decoder 1120 and the I/O interface 1130.

Here, the image data included in the AI encoding data may be identified as being image data generated via a certain codec (for example, MPEG-2, H.264, MPEG-4, HEVC, VC-1, VP8, VP9, or AV1). In this case, corresponding information may be transmitted to the first decoder 1120 through the output interface 1113 such that the image data is processed in the identified codec.

The AI encoding data according to an embodiment of the disclosure may be obtained from a data storage medium including a hard disk or the like, and the decoding apparatus 1100 according to an embodiment of the disclosure may obtain the AI encoding data from the data storage medium through an input and output interface, such as a universal serial bus (USB) port or the like.

Also, the AI encoding data received from the communication interface 1111 may be stored in a memory, and the parser 1112 may parse the AI encoding data obtained from the memory. However, an embodiment of the disclosure is not limited thereto.

The first decoder 1120 reconstructs the second image corresponding to the first image, based on the image data.

The second image generated by the first decoder 1120 is transmitted to the I/O interface 1130. According to an embodiment of the disclosure, first decoding-related information, such as mode information and quantization parameter information, included in the image data may be further transmitted to the I/O interface 1130.

The I/O interface 1130 may receive the AI data from the output interface 1113.

The I/O interface 1130 may transmit or receive data to or from an external apparatus via the input and output interface. For example, the I/O interface 1130 may transmit and receive video data, audio data, and additional data. Alternatively, the I/O interface 1130 may request the external apparatus for a command or receive the command from the external apparatus, and transmit a response message regarding the command. However, an embodiment of the disclosure is not limited thereto.

Referring back to FIG. 13, the I/O interface 1130 may transmit, to the AI up-scaling apparatus 1200, the second image received from the first decoder 1120 and the AI data received from the output interface 1113.

For example, the I/O interface 1130 may include HDMI and transmit the second image and the AI data to the AI up-scaling apparatus 1200 via the HDMI.

Alternatively, the I/O interface 1130 may include DP and transmit the second image and the AI data to the AI up-scaling apparatus 1200 via the DP.

Hereinafter, a data structure of the AI data in a form of the metadata will be described in detail with reference to FIG. 14.

Figure 14:
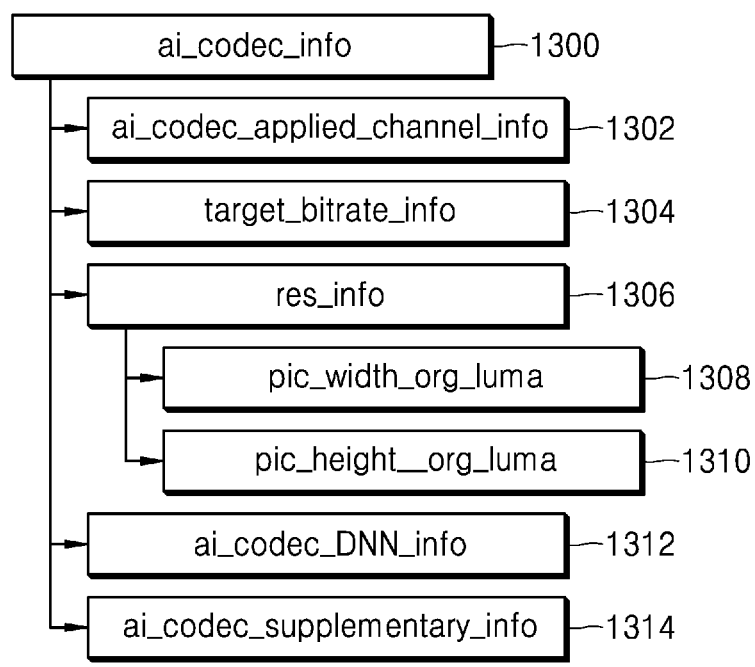
FIG. 14 shows AI data in a form of metadata, according to an embodiment of the disclosure.

FIG. 14 shows a data structure of AI data in a form of metadata, according to an embodiment of the disclosure.

The AI data according to an embodiment of the disclosure may be included in metadata of a header of a video file or metadata of a segment. For example, when an MP4 file format described above is used, the video file or segment may include a media data box including actual media data and a metadata box including metadata related to media. The AI data in the form of metadata described with reference to FIG. 14 may be transmitted in the metadata box.

Referring to FIG. 14, the AI data according to an embodiment may include elements such as ai_codec_info 1300, ai_codec_applied_channel_info 1302, target_bitrate_info 1304, res_info 1306, ai_codec_DNN_info 1312, and ai_codec_supplementary_info 1314. An arrangement of the elements shown in FIG. 14 is only an example and one of ordinary skill in the art may change the arrangement of the elements According to an embodiment of the disclosure, the ai_codec_info 1300 denotes whether AI up-scaling is applied to a low resolution image such as the second image 135. When the ai_codec_info 1300 indicates that the AI up-scaling is applied to the second image 135 reconstructed according to image data, the data structure of the AI data includes elements for obtaining up-scaling DNN information used for the AI up-scaling.

The ai_codec_applied_channel_info 1302 is channel information indicating a color channel to which AI up-scaling is applied. An image may be represented in an RGB format, a YUV format, a YCbCr format or the like, and a color channel that requires AI up-scaling may be indicated among YCbCr color channels, RGB color channels, or YUV color channels, according to a type of a frame.

The target_bitrate_info 1304 is information indicating a bitrate of the image data obtained as a result of first encoding by the first encoder 614. The AI up-scaler 234 may obtain AI up-scaling DNN information suitable for the quality of the second image 135, according to the target_bitrate_info 1304.

The res_info 1306 indicates resolution information related to resolution of a high resolution image on which AI up-scaling is performed, such as the third image 145. The res_info 1306 may include pic_width_org_luma 1308 and pic_height_org_luma 1310. The pic_width_org_luma 1308 and the pic_height_org_luma 1310 respectively indicate the width and height of the high resolution image and are respectively high resolution image width information and high resolution image height information. The AI up-scaler 234 may determine an AI up-scaling ratio according to the resolution of the high resolution image determined according to pic_width_org_luma 1308 and pic_height_org_luma 1310 and the resolution of the low resolution image reconstructed by the first decoder 232.

The ai_codec_DNN_info 1312 is information indicating mutually agreed AI up-scaling DNN information used for the AI up-scaling of the second image 135. The AI up-scaler 234 may determine the AI up-scaling DNN information among a pre-stored plurality of pieces of DNN setting information, according to the ai_codec_applied_channel_info 1302, target_bitrate_info 1304, and res_info 1306. Also, the AI up-scaler 234 may determine the AI up-scaling DNN information among the pre-stored plurality of pieces of DNN setting information by additionally considering other features (genre, maximum luminance, color gamut, and the like) of an image and encoded codec information.

DNN information indicating an AI up-scaling DNN may be represented by an identifier indicating one of pieces of DNN setting information pre-stored in the AI up-scaler 234 as described above or may include information about at least one of the number of convolution layers included in DNN, the number of filter kernels for each convolution layer, or a parameter of each filter kernel.

The ai_codec_supplementary_info 1314 indicates supplementary information about the AI up-scaling. The ai_codec_supplementary_info 1314 may include information required to determine the AI up-scaling DNN information applied to a video. The ai_codec_supplementary_info 1314 may include information about a genre, HDR maximum illumination, HDR color gamut, HDR PQ, codec, and a rate control type.

Meanwhile, when the AI data is included in the metadata of the segment, the AI data may further include dependent_ai_condition_info indicating dependency information.

The dependent_ai_condition_info indicates whether a current segment inherits AI data of a previous segment.

For example, when the dependent_ai_condition_info indicates that the current segment inherits the AI data of the previous segment, metadata of the current segment does not include the AI data corresponding to the ai_codec_info 1300 through the ai_codec_supplementary_info 1314 described above. Instead, the AI data of the current segment is determined to be the same as the AI data of the previous segment.

Also, when the dependent_ai_condition_info indicates that the current segment does not inherit the AI data of the previous segment, the metadata of the current segment includes the AI data. Accordingly, AI data related to media data of the current segment may be obtained.

Meanwhile, the receiver 1110 and the first decoder 1120 according to an embodiment of the disclosure are described as individual apparatuses, but may be implemented via one processor. In this case, the receiver 1110 and the first decoder 1120 may be implemented via a separate dedicated processor or may be implemented via a combination of software (S/W) and a general-purpose processor, such as an application processor (AP), a central processor unit (CPU), or a graphics processing unit (GPU). Also, the dedicated processor may be implemented by including a memory for implementing an embodiment of the disclosure or by including a memory processor for using an external memory.

Also, the receiver 1110 and the first decoder 1120 may be implemented via one or more processors. In this case, the receiver 1110 and the first decoder 1120 may be implemented via a combination of dedicated processors or may be implemented via a combination of S/W and a plurality of general-purpose processors, such as AP, CPU, or GPU.

Figure 15:
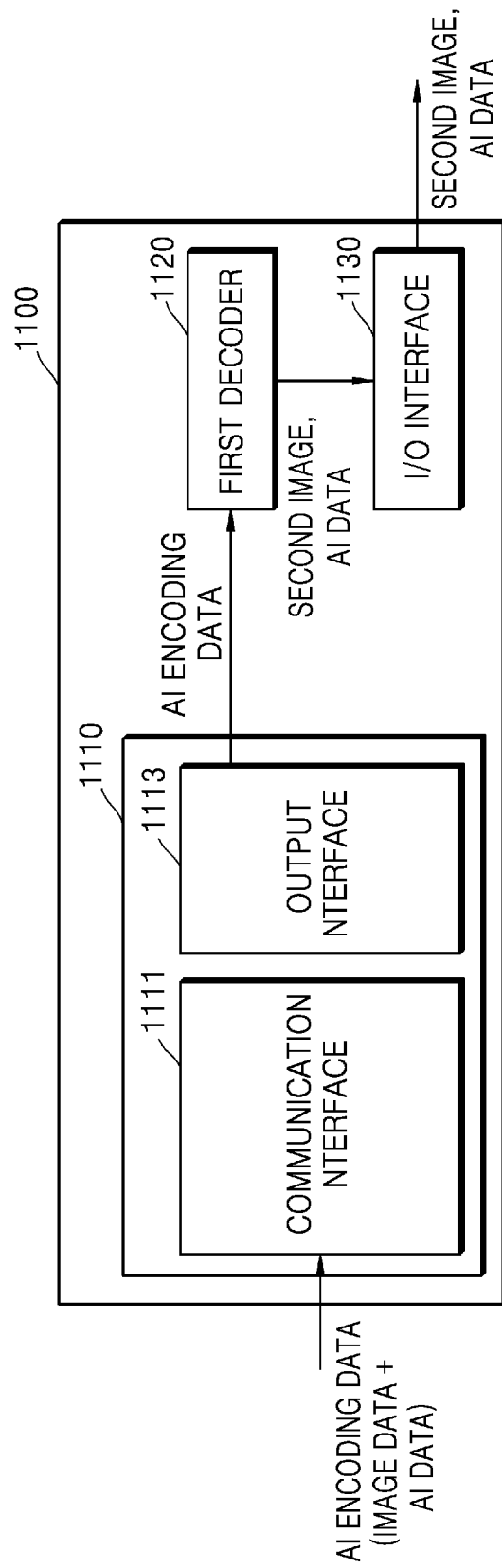
FIG. 15 is a diagram for describing a case in which AI data is received in a form of a bitstream, according to an embodiment of the disclosure.

FIG. 15 is a diagram for describing a case in which the AI data is received in the form of the bitstream by being included in the image data, according to an embodiment of the disclosure.

Because the configurations of the communication interface 1111, the output interface 1113, the first decoder 1120, and the I/O interface 1130 of FIG. 15 have been described above in detail with reference to FIG. 13, the same descriptions thereof will not be provided again.

Referring to FIG. 15, the communication interface 1111 according to an embodiment of the disclosure may receive the bitstream in which the image data and the AI data are encoded together. Here, the AI data may be included in the bitstream in a form of a supplemental enhancement information (SEI) message that is information capable of additionally enhancing a function of codec used for first encoding and first decoding. The SEI message may be transmitted in units of frames.

When the AI encoding data is received in the form of the bitstream in which the image data and the AI data are encoded together, the image data and the AI data are unable to be distinguished from each other. Thus, the communication interface 1111 transmits the AI encoding data in the form of the bitstream to the output interface 1113 and the output interface 1113 transmits the AI encoding data in the form of the bitstream to the first decoder 1120.

The first decoder 1120 reconstructs the second image corresponding to the first image, based on the image data included in the bitstream received from the output interface 1113 and transmits the second image to the I/O interface 1130.

Also, the first decoder 1120 separates a payload of the SEI message including the AI data from the bitstream and transmits the payload to the I/O interface 1130.

The I/O interface 1130 may transmit, to the AI up-scaling apparatus 1200, the second image and the payload of the SEI message (for example, the AI data) received from the first decoder 1120. The AI up-scaling apparatus 1200, in some embodiments, produces a third image. The third image may be displayed by the AI up-scaling apparatus 1200 or provided to a display device.

Here, the AI data may be included in the SEI message in a form of a high level syntax, as shown in FIG. 16.

FIG. 16 shows an AI codec syntax table, according to an embodiment of the disclosure.

Referring to FIG. 16, the AI codec syntax table may include an AI codec main syntax table (ai_codec_usage_main). The AI codec main syntax table includes elements related to AI up-scaling DNN information used for AI up-scaling of a second image reconstructed according to image data. The AI codec main syntax table may include AI data applied to AI up-scaling of all frames in a video file.

According to the AI codec main syntax table of FIG. 16, syntax elements such as ai_codec_info, ai_codec_applied_channel_info, target_bitrate, pic_width_org_luma, pic_height_org_luma, ai_codec_DNN_info, and ai_codec_supplementary_info_flag are parsed.

The ai_codec_info corresponds to the ai_codec_info 1300 of FIG. 14 and indicates whether AI up-scaling is allowed for the second image. When the ai_codec_info indicates that the AI up-scaling is allowed (if(ai_codec_info)), syntax elements required to determine the AI up-scaling DNN information are parsed.

The ai_codec_applied_channel_info is channel information corresponding to the ai_codec_applied_channel_info 1302 of FIG. 14. The target_bitrate is target bitrate information corresponding to the target_bitrate_info 1304 of FIG. 14. The pic_width_org_luma and the pic_height_org_luma are high resolution image width information and high resolution image height information corresponding to the pic_width_org_luma 1308 and the pic_height_org_luma 1310 of FIG. 14, respectively. The ai_codec_DNN_info is DNN information corresponding to the ai_codec_DNN_info 1312 of FIG. 14.

The ai_codec_supplementary_info_flag is a supplementary information flag indicating whether the ai_codec_supplementary_info 1314 of FIG. 14 is included in the syntax table. When the ai_codec_supplementary_info_flag indicates that the supplementary information used for the AI up-scaling is not parsed, additional supplementary information is not obtained. However, when the ai_codec_supplementary_info_flag indicates that the supplementary information used for the AI up-scaling is parsed (if(ai_codec_supplementary_info_flag)), the additional supplementary information is obtained.

The obtained additional supplementary information may include ai_cdeco_DNNstruct_info, genre_info, hdr_max_luminance, hdr_color_gamut, hdr pq_type, and rate_control_type. The ai_codec_DNNstruct_info is information indicating a structure and parameter for new DNN setting information suitable for an image, separately from DNN setting information pre-stored in an AI up-scaler. For example, information about at least one of the number of convolution layers, the number of filter kernels for each convolution layer, or a parameter of each filter kernel may be included.

The genre_info indicates a genre of content of the image data, the hdr_max_luminance indicates high dynamic range (HDR) maximum luminance applied to a high resolution image, the hdr_color_gamut indicates a HDR color gamut applied to the high resolution image, the hdr_pq_type indicates HDR perceptual quantizer (PQ) information applied to the high resolution image, and the rate_control_type indicates a rate control type applied to the image data obtained as a result of first encoding. According to an embodiment of the disclosure, a particular syntax element may be parsed from among the syntax elements corresponding to the supplementary information.

Also, the AI codec syntax table according to an embodiment of the disclosure may include an AI codec frame syntax table (ai_codec_usage_frame) including AI data applied to a current frame.

Figure 17:
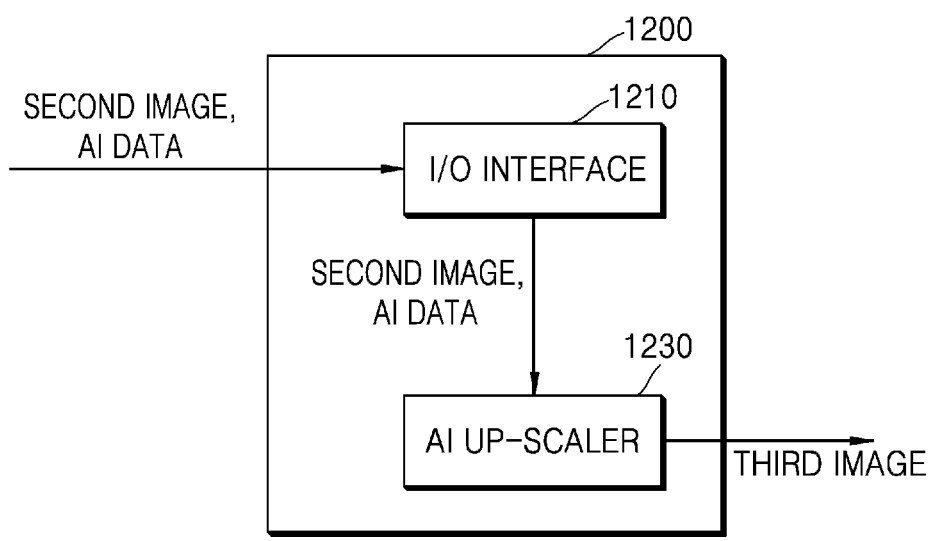
FIG. 17 is a block diagram of a configuration of an AI up-scaling apparatus, according to an embodiment of the disclosure.

FIG. 17 is a block diagram of a configuration of the AI up-scaling apparatus 1200, according to an embodiment of the disclosure.

Referring to FIG. 17, the AI up-scaling apparatus 1200 may include an input/output (I/O) device 1210 and an AI up-scaler 1230.

The I/O interface 1210 may receive a second image and AI data from the decoding apparatus 1100. Here, the I/O interface 1210 may include HDMI, DP, or the like.

The I/O interface 1210 may receive the second image and the AI data through the HDMI when the decoding apparatus 1100 according to an embodiment of the disclosure and the AI up-scaling apparatus 1200 are connected to each other via an HDMI cable.

Alternatively, the I/O interface 1210 may receive the second image and the AI data through the DP when the decoding apparatus 1100 according to an embodiment of the disclosure and the AI up-scaling apparatus 1200 are connected to each other via a DP cable. However, an embodiment of the disclosure is not limited thereto, and the second image and the AI data may be received via any one of various input and output interfaces. Also, the I/O interface 1210 may receive the second image and the AI data via an input and output interface of another manner.

The I/O interface 1210 may transmit the second image and the AI data to the AI up-scaler 1230. When the AI data is transmitted, the AI up-scaler 1230 according to an embodiment of the disclosure may determine an up-scaling target of the second image, based on at least one of difference information included in the AI data or first image-related information. For example, based on the AI data described with reference to FIGS. 14 and 16, the up-scaling target of the second image may be determined.

The up-scaling target may indicate, for example, to what extent the second image is to be up-scaled. When the up-scaling target is determined, the AI up-scaler 1230 may perform AI up-scaling on the second image via a second DNN for generating a third image corresponding to the up-scaling target. Because a method of performing AI up-scaling on the second image via the second DNN has been described in detail with reference to FIGS. 3 through 6, detailed descriptions thereof will be omitted.

The AI up-scaler 1230 according to an embodiment of the disclosure may obtain new DNN setting information based on the AI data instead of DNN setting information pre-stored in the AI up-scaling apparatus 1200, and perform AI up-scaling on the second image by setting the second DNN with the obtained new DNN setting information.

Meanwhile, when the I/O interface 1210 receives only the second image and does not receive the AI data, the I/O interface 1210 may transmit the second image to the AI up-scaler 1230. The AI up-scaler 1230 may generate a fourth image by performing AI up-scaling on the second image according to a pre-set method without using the AI data. Here, the fourth image may have lower image quality than the third image on which AI up-scaling is performed by using the AI data.

Figure 18:
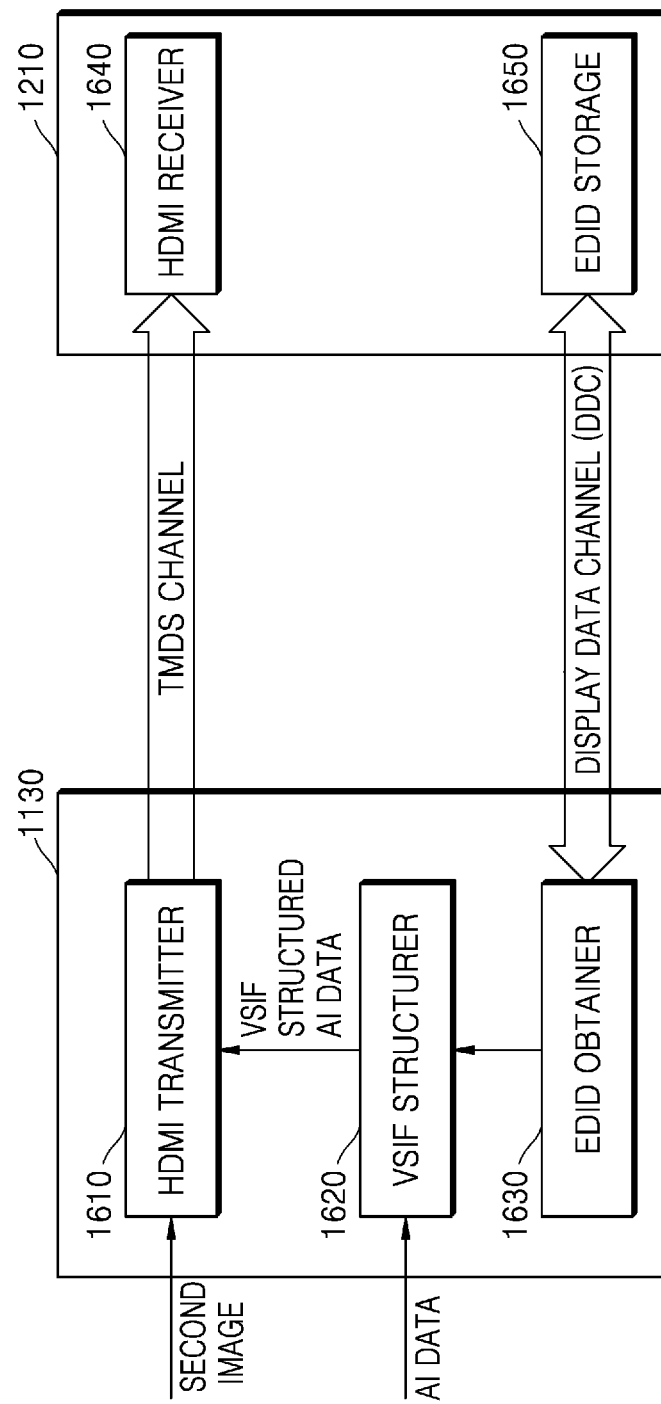
FIG. 18 is a diagram showing an example in which a decoding apparatus and an AI up-scaling apparatus transmit and receive data through a high definition multimedia interface (HDMI), according to an embodiment of the disclosure.

FIG. 18 is a diagram showing an example in which the decoding apparatus 1100 and the AI up-scaling apparatus 1200 transmit and receive data through an HDMI, according to an embodiment of the disclosure.

The I/O interface 1130 of the decoding apparatus 1100 and the I/O interface 1210 of the AI up-scaling apparatus 1200 may be connected to each other via an HDMI cable. When the I/O interface 1130 of the decoding apparatus 1100 and the I/O interface 1210 of the AI up-scaling apparatus 1200 are connected to each other via the HDMI cable, pairing of four channels providing a TMDS data channel and a TMDS clock channel may be performed. The TMDS channel includes three data transmission channels and may be used to transmit video data, audio data, and additional data. Here, a packet structure is used to transmit the audio data and the additional data through the TMDS data channel.

In addition, the I/O interface 1130 of the decoding apparatus 1100 and the I/O interface 1210 of the AI up-scaling apparatus 1200 may provide a display data channel (DDC).

The DDC is a protocol standard for transmitting digital information between a computer graphic adaptor and a monitor (for example, a computer display device) defined by the Video Electronics Standard Association (VESA). The DDC is used for configuration and state information exchange between one source device (for example, a decoding apparatus) and one sync device (for example, an AI up-scaling apparatus). In some embodiments, I/O interface 1210 is included in a display device, such as a TV, mobile phone, tablet computer, etc.

Referring to FIG. 18, the I/O interface 1130 of the decoding apparatus 1100 may include an HDMI transmitter 1610, a VSIF structurer 1620, and an extended display identification data (EDID) obtainer 1630. Also, the I/O interface 1210 of the AI up-scaling apparatus 1200 may include an HDMI receiver 1640 and an EDID storage 1650.

The EDID storage 1650 of the AI up-scaling apparatus 1200 according to an embodiment of the disclosure may include EDID information. The EDID information is a data structure including various types of information regarding the AI up-scaling apparatus 1200 and may be transmitted to the decoding apparatus 1100 via the DDC.

The EDID information according to an embodiment of the disclosure may include information about AI up-scaling capability of the AI up-scaling apparatus 1200. For example, the EDID information may include information about whether the AI up-scaling apparatus 1200 is able to perform AI up-scaling. This will be described in detail with reference to FIG. 19.

Figure 19:
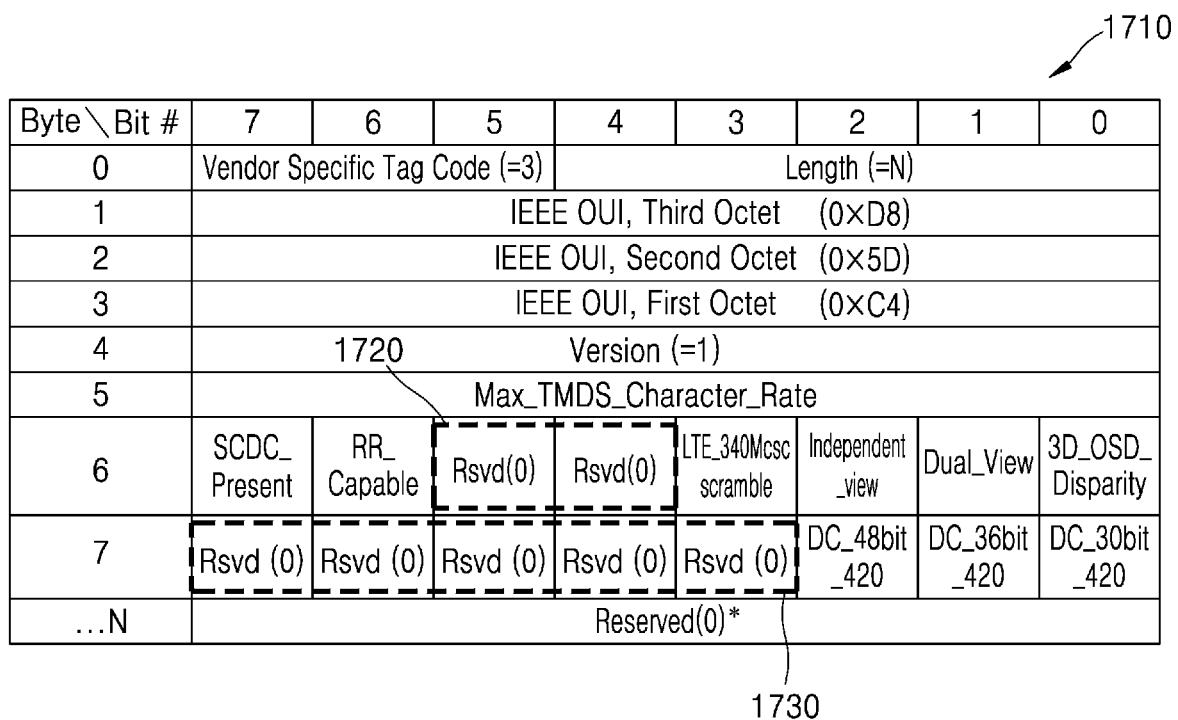
FIG. 19 is a diagram of an HDMI forum (HF)-vendor-specific data block (VSDB) included in extended display identification data (EDID) information, according to an embodiment of the disclosure.

FIG. 19 is a diagram of an HDMI forum (HF)-vendor-specific data block (VSDB) included in the EDID information, according to an embodiment of the disclosure.

The EDID information may include an EDID extension block including supplementary information. The EDID extension block may include an HF-VSDB 1710. The HF-VSDB 1710 is a data block where vendor-specific data is definable, and HDMI-specific data may be defined by using the HF-VSDB 1710.

The HF-VSDB 1710 according to an embodiment may include reserved fields 1720 and 1730. Information about the AI up-scaling capability of the AI up-scaling apparatus 1200 may be described by using at least one of the reserved fields 1720 and 1730 of the HF-VSDB 1710. For example, when an AI up-scaling apparatus is able to perform AI up-scaling by using 1 bit of a reserved field, a bit value of the reserved field may be set to 1, and when the AI up-scaling apparatus is unable to perform AI up-scaling, the bit value of the reserved field may be set to 0. Alternatively, when the AI up-scaling apparatus is able to perform AI up-scaling, the bit value of the reserved field may be set to 0, and when the AI up-scaling apparatus is unable to perform AI up-scaling, the bit value of the reserved field may be set to 1.

Referring back to FIG. 18, the EDID obtainer 1630 of the decoding apparatus 1100 may receive the EDID information of the AI up-scaling apparatus 1200 through the DDC. The EDID information according to an embodiment of the disclosure may be transmitted as the HF-VSDB, and the EDID obtainer 1630 may obtain information about the AI up-scaling capability of the AI up-scaling apparatus 1200 by using a reserved field value of the HF-VSDB.

The EDID obtainer 1630 may determine whether to transmit the AI data to the AI up-scaling apparatus 1200, based on the information about the AI up-scaling capability of the AI up-scaling apparatus 1200. For example, when the AI up-scaling apparatus 1200 is able to perform AI up-scaling, the EDID obtainer 1630 may operate such that the VSIF structurer 1620 structures the AI data in a form of a VSIF packet. On the other hand, when the AI up-scaling apparatus 1200 is unable to perform AI up-scaling, the EDID obtainer 1630 may operate such that the VSIF structurer 1620 does not structure the AI data in a form of a VSIF packet.

The VSIF structurer 1620 may structure the AI data transmitted from the first decoder 1120 or the output interface 1113 in a form of a VSIF packet. The VSIF packet will be described with reference to FIG. 20.

FIG. 20 is a diagram of a header structure and content structure of a VSIF, according to an embodiment of the disclosure.

Referring to FIG. 20, the VSIF packet includes a VSIF packet header 1810 and a VSIF packet content 1820. The VSIF packet header 1810 may include 3 bytes, wherein a first byte HB0 is a value indicating a packet type and a value of the VSIF packet is represented as 0x81, a second byte HB1 indicates version information, and lower 6 bits of a third byte HB2 indicate the length of the VSIF packet content 1820 in units of bytes.

The VSIF structurer 1620 according to an embodiment of the disclosure may structure the AI data in the form of the VSIF packet. For example, the VSIF structurer 1620 may generate the VSIF packet such that the VSIF packet includes the AI data. The VSIF structurer 1620 may generate the VSIF packet content 1820 such that the AI data described with reference to FIGS. 14 and 16 is described in reserved field values 1830 of a fifth packet byte PB5 included in the VSIF packet content 1820 and reserved field values 1840 of an NV-th packet byte PB(Nv). Alternatively, the VSIF packet content 1820 may be generated such that the AI data is described in reserved field values of NV+k-th packet byte, wherein k is an integer from 1 to n.

The VSIF structurer 1620 may determine a packet byte for describing the AI data according to an amount of the AI data. When the amount of AI data is small, the AI data may be described by only using the reserved field values 1830 of the fifth packet byte PB5. On the other hand, when the amount of AI data is large, the AI data may be described by using the reserved field values 1830 and 1840 of the fifth packet byte PB5 and the NV-th packet byte PB(Nv). Alternatively, the AI data may be described by using the reserved field values 1840 of the NV-th packet byte PB(Nv) and the reserved field values of the NV+k-th packet byte. However, an embodiment of the disclosure is not limited thereto and the AI data may be structured in the form of the VSIF packet via any one of various methods.

Figure 21:
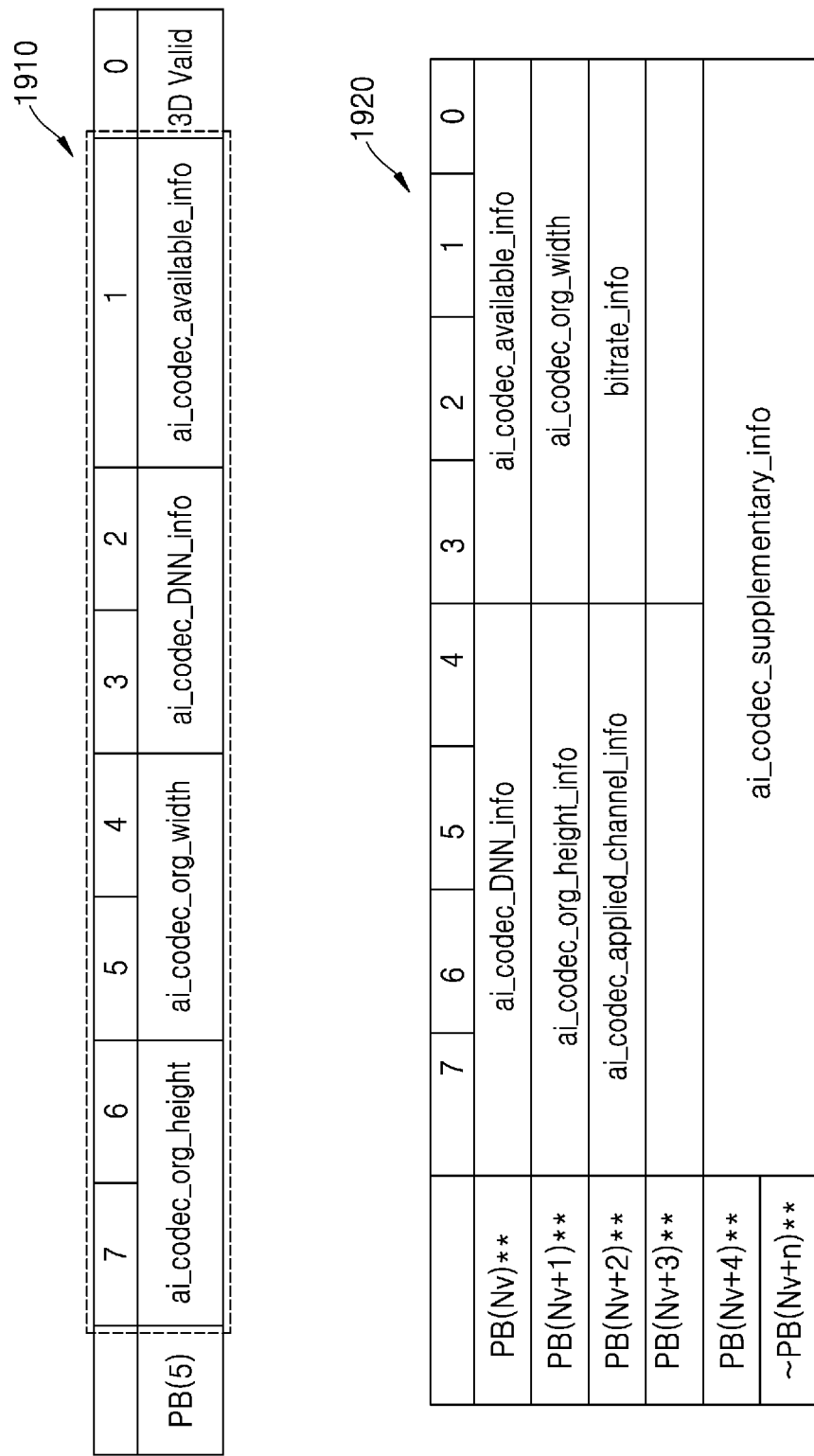
FIG. 21 is a diagram showing an example in which AI data is defined in a VSIF packet, according to an embodiment of the disclosure.

FIG. 21 is a diagram showing an example in which the AI data is defined in the VSIF packet, according to an embodiment of the disclosure.

Referring to a reference numeral 1910 of FIG. 21, the VSIF structurer 1620 according to an embodiment of the disclosure may describe the AI data by only using reserved field values of the fifth packet byte PB5. The VSIF structurer 1620 may define ai_codec_available info by using bit 1 of the fifth packet byte PB5. The ai_codec_available_info indicates whether AI up-scaling is allowed for a current frame. Also, ai_codec_DNN_info may be defined by using at least one of bits 2 to 3 of the fifth packet byte PB5. The ai_codec_DNN_info is DNN information indicating an AI up-scaling DNN used to perform AI up-scaling on the current frame. For example, DNN setting information for the up-scaling DNN, an identifier of the up-scaling DNN, and an identifier of a value of a lookup table for the up-scaling DNN may be included.

Also, ai_codec_org_width may be defined by using at least one of bits 4 to 5 of the fifth packet byte PB5, and ai_codec_org_height may be defined by using at least one of bits 6 to 7 of the fifth packet byte PB5. ai_codec_org_width denotes the width of the original image 105 while denoting the width of the third image 145. Also, ai_codec_org_height denotes the height of the original image 105 while denoting the height of the third image 145. ai_codec_org_height and ai_codec_org_width are used to determine a size of an up-scaling target.

Referring to a reference numeral 1920 of FIG. 21, the VSIF structurer 1620 according to an embodiment of the disclosure may describe the AI data by using reserved field values of the NV-th packet byte PB(Nv) and the NV+k-th packet byte.

ai_codec_available_info may be defined by using at least one of bits 0 to 3 of the NV-th packet byte PB(Nv).

Also, ai_codec_DNN_info may be defined by using at least one of bits 4 to 7 of the NV-th packet byte PB(Nv).

In addition, ai_codec_org_width may be defined by using at least one of bits 0 to 3 of a Nv+1-th packet byte PB(Nv+1) and ai_codec_org_height may be defined by using at least one of bits 4 to 7 of the Nv+1-th packet byte PB(Nv+1).

Also, bitrate_info may be defined by using at least one of bits 0 to 3 of the NV+2-th packet byte PB(Nv+2). The bitrate_info is information indicating the degree of quality of a reconstructed second image.

Also, ai_codec_applied_channel_info may be defined by using at least one of bits 4 to 7 of the NV+2-th packet byte PB(Nv+2). The ai_codec_applied_channel_info is channel information indicating a color channel that requires AI up-scaling. The color channel that requires AI up-scaling may be indicated among YCbCr color channels, RGB color channels, or YUV color channels, according to a type of a frame.

Also, ai_codec_supplementary_info may be defined by using at least one of bits of remaining packet bytes (for example, bits included in an NV+4-th packet byte PB(Nv+4) to an Nv+n-th packet byte PB(Nv+n). The ai_codec_supplementary_info indicates supplementary information used for AI up-scaling. The supplementary information may include a structure and parameter about new DNN setting information suitable for a current image, a genre, a color range, HDR maximum illumination, HDR color gamut, HDR PQ information, codec information, and a rate control (RC) type.

However, the structure of the VSIF packet shown in FIG. 21 is only an example and thus is not limited thereto. When necessary, locations or sizes of fields where the AI data included in the VSIF packet of FIG. 19 is defined may be changed and the AI data described with reference to FIGS. 14 and 16 may be further included in the VSIF packet.

Referring back to FIG. 18, the VSIF structurer 1620 according to an embodiment of the disclosure may generate a VSIF packet corresponding to each of a plurality of frames. For example, when the AI data is received once for the plurality of frames, the VSIF structurer 1620 may generate the VSIF packet corresponding to each of the plurality of frames by using the AI data that is received once. For example, the VSIF packets corresponding to the plurality of frames may be generated based on the same AI data.

On the other hand, when the AI data is received a plurality of times for the plurality of frames, the VSIF structurer 1620 may generate a new VSIF packet by using the newly received AI data.

The VSIF structurer 1620 may transmit the generated VSIF packet to the HDMI transmitter 1610, and the HDMI transmitter 1610 may transmit the VSIF packet to the AI up-scaling apparatus 1200 through the TMDS channel.

Also, the HDMI transmitter 1610 may transmit the second image received from the first decoder 1120 to the AI up-scaling apparatus 1200 through the TMDS channel.

The HDMI receiver 1640 of the AI up-scaling apparatus 1200 may receive the AI data structured in the form of the VSIF packet and the second image through the TMDS channel.

The HDMI receiver 1640 of the AI up-scaling apparatus 1200 according to an embodiment of the disclosure may determine whether the AI data is included in the VSIF packet by searching the VSIF packet after checking header information of the HDMI packet.

For example, the HDMI receiver 1640 may determine whether the received HDMI packet is the VSIF packet by determining whether the first byte HB0 indicating the packet type among the header information of the received HDMI packet is 0x81. Also, when it is determined that the HDMI packet is the VSIF packet, the HDMI receiver 1640 may determine whether the AI data is included in the VSIF packet content. For example, the HDMI receiver 1640 may obtain the AI data by using values of bits included in the Nv-th packet byte PB(Nv) to Nv+n-th packet byte PB(Nv+n) included in the VSIF packet content, when the values of the bits are set. For example, the HDMI receiver 1640 may obtain ai_codec_available_info by using at least one of bits 0 to 3 of the Nv-th packet byte PB(Nv) of the VSIF packet content and obtain ai_codec_DNN_info by using at least one of bits 4 to 7 of the Nv-th packet byte PB(Nv).

Also, the HDMI receiver 1640 may obtain ai_codec_org_width by using at least one of bits 0 to 3 of the Nv+1-th packet byte PB(Nv+1) and obtain ai_codec_org_height by using at least one of bits 4 to 7 of the Nv+1-th packet byte PB(Nv+1).

Also, the HDMI receiver 1640 may obtain bitrate_info by using at least one of bits 0 to 3 of the Nv+2-th packet byte PB(NV+2) and obtain ai_codec_applied_channel_info by using at least one of bits 4 to 7 of the Nv+2-th packet byte PB(NV+2).

Also, the HDMI receiver 1640 may obtain ai_codec_supplementary_info by using at least one of bits of the remaining packet bytes (for example, bits included in the Nv+4-th packet byte PB(NV+4) to Nv+n-th packet byte PB(Nv+n)).

The HDMI receiver 1640 may provide the AI data obtained from the VSIF packet content to the AI up-scaler 1230 and also provide the second image to the AI up-scaler 1230.

Upon receiving the second image and the AI data from the HDMI receiver 1640, the AI up-scaler 1230 according to an embodiment of the disclosure may determine an up-scaling target of the second image, based on at least one of difference information included in the AI data or first image-related information. The up-scaling target may indicate, for example, to what extent the second image is to be up-scaled. When the up-scaling target is determined, the AI up-scaler 1230 may perform AI up-scaling on the second image via a second DNN for generating a third image corresponding to the up-scaling target. Because a method of performing AI up-scaling on the second image via the second DNN has been described in detail with reference to FIGS. 3 through 6, detailed descriptions thereof will be omitted.

Meanwhile, in FIGS. 18 through 21, the decoding apparatus 1100 and the AI up-scaling apparatus 1200 are connected to each other via the HDMI cable, but an embodiment is not limited thereto, and the decoding apparatus 1100 and the AI up-scaling apparatus 1200 may be connected via the DP cable according to an embodiment of the disclosure. When the decoding apparatus 1100 and the AI up-scaling apparatus 1200 are connected to each other via the DP cable, the decoding apparatus 1100 may transmit the second image and the AI data to the AI up-scaling apparatus 1200 via the DP in a similar manner as the HDMI.

Also, the decoding apparatus 1100 according to an embodiment of the disclosure may transmit the second image and the AI data to the AI up-scaling apparatus 1200 via an input and output interface other than the HDMI or DP.

Also, the decoding apparatus 1100 according to an embodiment of the disclosure may transmit the second image and the AI data to the AI up-scaling apparatus 1200 via different interfaces. For example, the second image may be transmitted via the HDMI and the AI data may be transmitted via the DP. Alternatively, the second image may be transmitted via the DP and the AI data may be transmitted via the HDMI.

Figure 22:
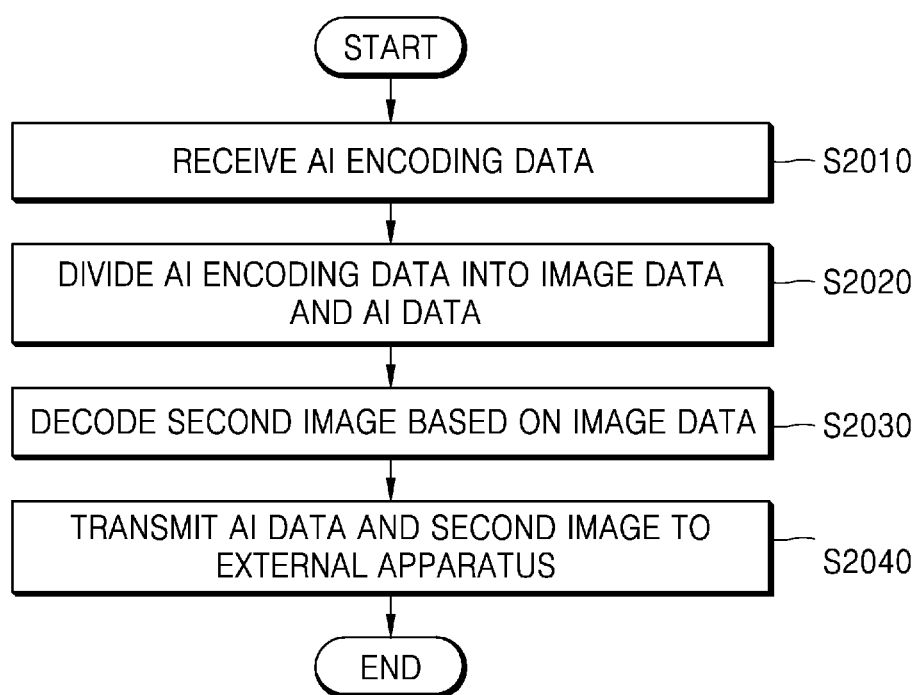
FIG. 22 is a flowchart of an operating method of a decoding apparatus, according to an embodiment of the disclosure.

FIG. 22 is a flowchart of an operating method of the decoding apparatus 1100, according to an embodiment of the disclosure.

Referring to FIG. 22, the decoding apparatus 1100 according to an embodiment of the disclosure may receive AI encoding data, in operation S2010.

For example, the decoding apparatus 1100 receives the AI encoding data generated as a result of AI encoding via a network. The AI encoding data is data generated as a result of AI down-scaling and first encoding of an original image, and may include image data and AI data.

Here, the AI data according to an embodiment of the disclosure may be received by being included in a video file together with the image data. When the AI data is included in the video file, the AI data may be included in metadata of a header of the video file. Alternatively, when the image data on which the AI encoding is performed is received as a segment split by pre-set time units, the AI data may be included in metadata of the segment. Alternatively, the AI data may be encoded and received by being included in a bitstream or may be received as a file separate from the image data. However, an embodiment of the disclosure is not limited thereto.

The decoding apparatus 1100 may divide the AI encoding data into the image data and the AI data, in operation S2020.

When the AI data according to an embodiment of the disclosure is received in a form of the metadata of the header of the video file or the metadata of the segment, the decoding apparatus 1100 may parse the AI encoding data and divide the AI encoding data into the image data and the AI data. For example, the decoding apparatus 1100 may read a box type of data received through the network to determine whether the data is the image data or the AI data.

When the AI data according to an embodiment of the disclosure is received in the form of the bitstream, the decoding apparatus 1100 may receive the bitstream in which the image data and the AI data are encoded together. Here, the AI data may be inserted in a form of an SEI message. The decoding apparatus 1100 may distinguish a payload of the SEI message including the image data and the AI data from the bitstream.

The decoding apparatus 1100 according to an embodiment of the disclosure may decode a second image, based on the image data, in operation S2030.

The decoding apparatus 1100 according to an embodiment of the disclosure may transmit, to an external apparatus, the second image and the AI data, through an input and output interface, in operation S2040.

The external apparatus according to an embodiment of the disclosure includes the AI up-scaling apparatus 1200.

For example, the decoding apparatus 1100 may transmit the second image and the AI data to the external apparatus, via an HDMI or a DP. When the AI data is transmitted via the HDMI, the decoding apparatus 1100 may transmit the AI data in a form of a VSIF packet.

Also, the transmitted AI data includes information enabling the second image to be AI up-scaled. For example, the AI data may include information indicating whether AI up-scaling is applied to the second image, information about a DNN for up-scaling the second image, and the like.

Figure 23:
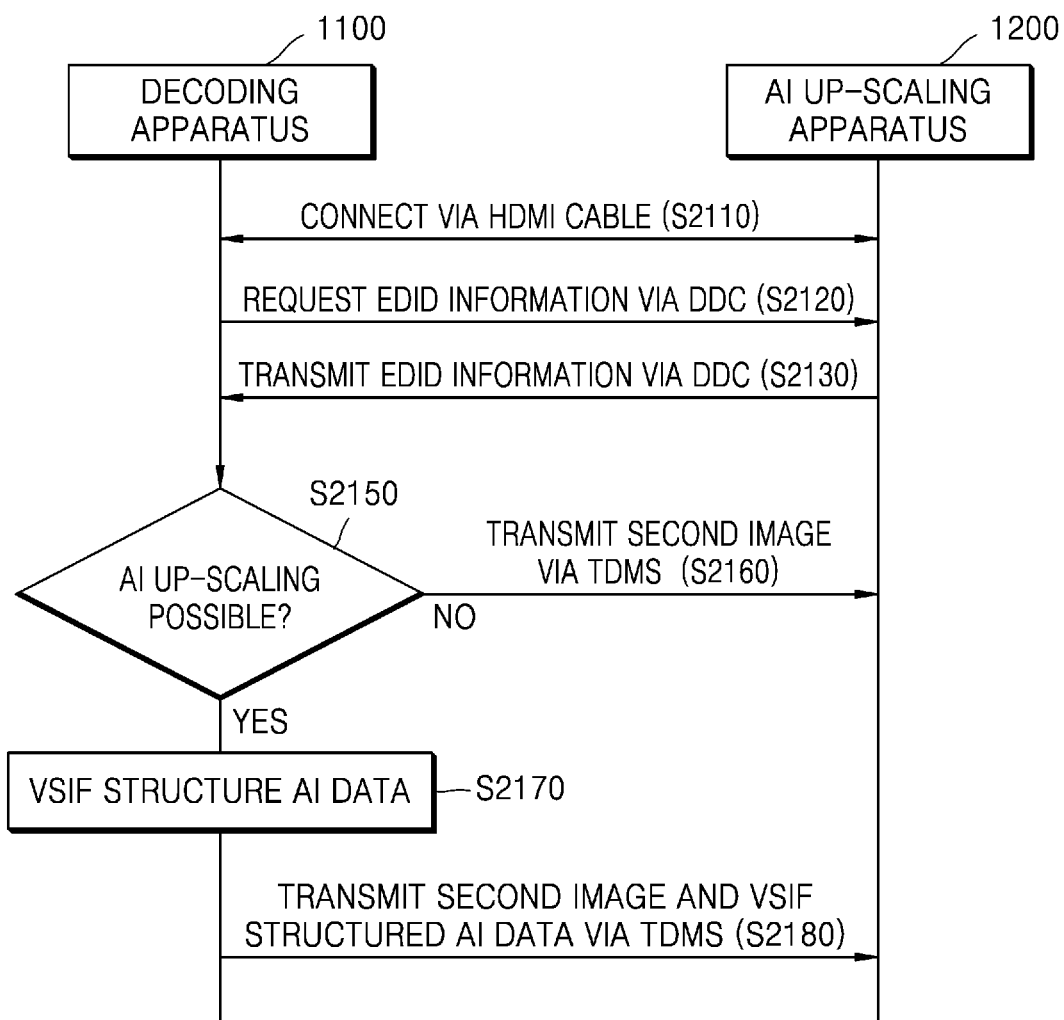
FIG. 23 is a flowchart of a method, performed by a decoding apparatus, of transmitting a second image and AI data via HDMI, according to an embodiment of the disclosure.

FIG. 23 is a flowchart of a method, performed by the decoding apparatus 1100, of transmitting a second image and AI data via HDMI, according to an embodiment of the disclosure.

Referring to FIG. 23, the decoding apparatus 1100 according to an embodiment of the disclosure may be connected to the AI up-scaling apparatus 1200 via an HDMI cable, in operation S2110.

The decoding apparatus 1100 may transmit an EDID information request to the AI up-scaling apparatus 1200 via a DDC, in operation S2120. In response to the EDID information request of the decoding apparatus 1100, the AI up-scaling apparatus 1200 may transmit, to the decoding apparatus 1100, EDID information stored in an EDID storage via the DDC (S2130). Here, the EDID information may include HF-VSDB and the HF-VSDB may include information about AI up-scaling capability of the AI up-scaling apparatus 1200.

The decoding apparatus 1100 may obtain the information about the AI up-scaling capability of the AI up-scaling apparatus 1200 by receiving the EDID information (for example, HF-VSDB).

The decoding apparatus 1100 may determine whether to transmit the AI data to the AI up-scaling apparatus 1200, based on the information about the AI up-scaling capability of the AI up-scaling apparatus 1200, in operation S2150. For example, when the AI up-scaling apparatus 1200 is unable to perform AI up-scaling, the decoding apparatus 1100 may not structure the AI data in a form of a VSIF packet, but may transmit only the second image to the AI up-scaling apparatus 1200 via a TDMS channel, in operation S2160.

When the AI up-scaling apparatus 1200 is able to perform AI up-scaling, the decoding apparatus 1100 may operate to structure the AI data in the form of the VSIF packet, in operation S2170.

The decoding apparatus 1100 may define the AI data by using values of reserved fields included in the VSIF packet. Because a method of defining the AI data in the VSIF packet has been described in detail with reference to FIGS. 20 and 21, descriptions thereof will not be provided again.

The decoding apparatus 1100 may transmit, to the AI up-scaling apparatus 1200, the second image and the AI data structured in the VSIF packet via the TMDS channel, in operation S2180.

Figure 24:
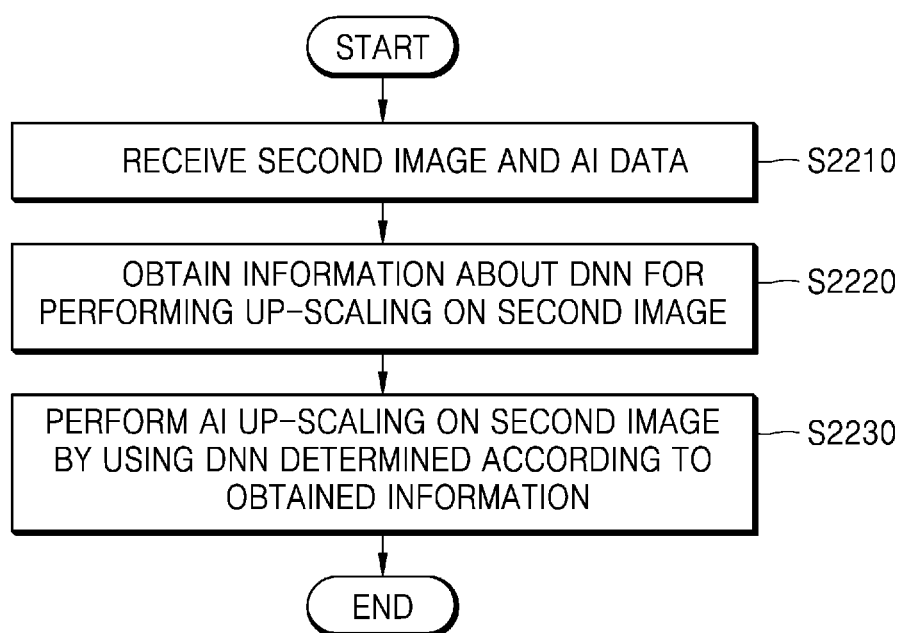
FIG. 24 is a flowchart of an operating method of an AI up-scaling apparatus, according to an embodiment of the disclosure.

FIG. 24 is a flowchart of an operating method of the AI up-scaling apparatus 1200, according to an embodiment of the disclosure.

Referring to FIG. 24, the AI up-scaling apparatus 1200 according to an embodiment of the disclosure may receive a second image and AI data via an input and output interface, in operation S2210.

For example, when connected to the decoding apparatus 1100 via an HDMI cable, the AI up-scaling apparatus 1200 may receive the second image and the AI data via an HDMI. Alternatively, when connected to the decoding apparatus 1100 via a DP cable, the AI up-scaling apparatus 1200 may receive the second image and the AI data via a DP. However, an embodiment of the disclosure is not limited thereto, and the second image and the AI data may be received via any one of various input and output interfaces. Also, the AI up-scaling apparatus 1200 may receive the second image and the AI data via an input and output interface of another manner.

The AI up-scaling apparatus 1200 may determine whether to perform AI up-scaling on the second image, based on whether the AI data is received through the input and output interface. When the AI data is not received, the second image may be output without performing AI up-scaling on the second image.

The AI up-scaling apparatus 1200 according to an embodiment of the disclosure may receive an HDMI packet from the decoding apparatus 1100 and search for a VSIF packet by identifying header information of the HDMI packet. When the VSIF packet is found, the AI up-scaling apparatus 1200 may determine whether the AI data is included in the VSIF packet.

The AI data may include information indicating whether AI up-scaling is applied to the second image, information about a DNN for up-scaling the second image, and the like.

The AI up-scaling apparatus 1200 may determine whether to perform AI up-scaling on the second image, based on the information indicating whether AI up-scaling is applied to the second image.

Also, the AI up-scaling apparatus 1200 may obtain information about a DNN for performing up-scaling on the second image, based on the AI data, in operation S2220, and generate a third image by performing AI up-scaling on the second image by using the DNN determined according to the obtained information, in operation S2230.

Figure 25:
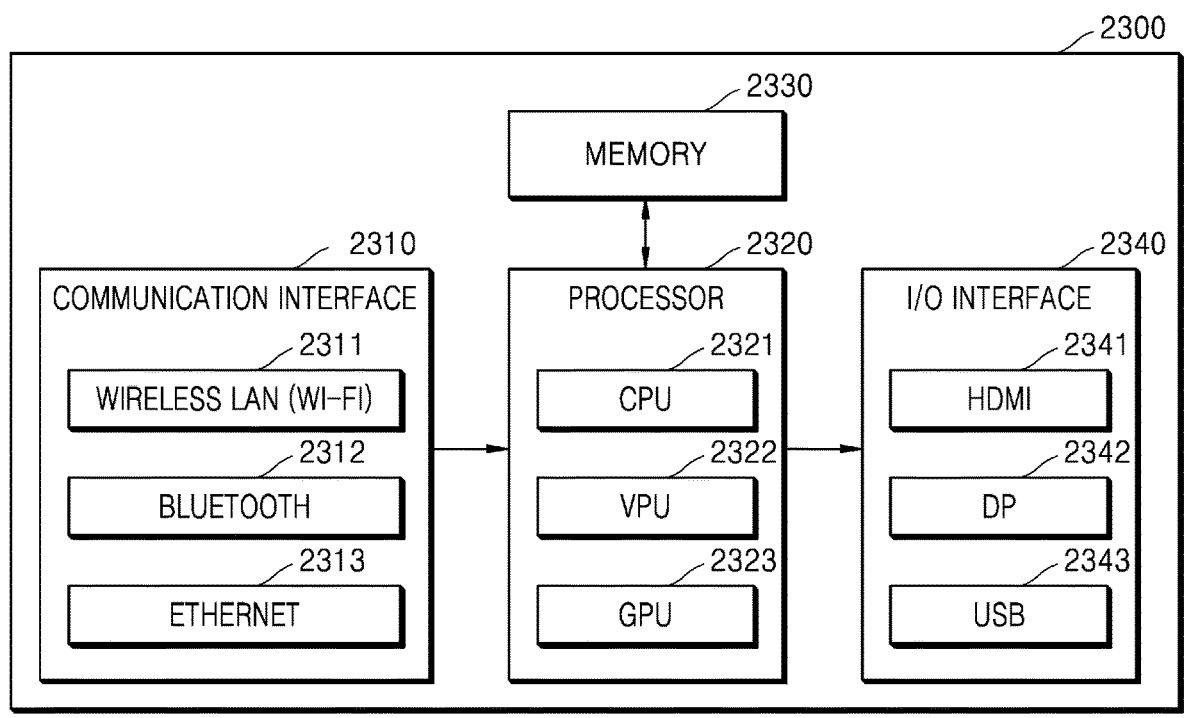
FIG. 25 is a block diagram of a configuration of a decoding apparatus, according to an embodiment of the disclosure.

FIG. 25 is a block diagram of a configuration of a decoding apparatus 2300, according to an embodiment of the disclosure.

The decoding apparatus 2300 of FIG. 25 is an example of the decoding apparatus 1100 of FIG. 12.

Referring to FIG. 25, the decoding apparatus 2300 according to an embodiment of the disclosure may include a communication interface 2310, a processor 2320, a memory 2330, and an input/output (I/O) device 2340.

The communication interface 2310 of FIG. 25 may correspond to the communication interface 1111 of FIGS. 13 and 15, and the I/O interface 2340 of FIG. 25 may correspond to the I/O interface 1130 of FIGS. 13 and 15. Accordingly, descriptions about FIG. 25, which are the same as those described with reference to FIGS. 13 and 15 will not be provided again.

The communication interface 2310 according to an embodiment of the disclosure may transmit and receive data or signal to or from an external apparatus (for example, a server) under control of the processor 2320. The processor 2320 may transmit and receive content to or from the external apparatus connected via the communication interface 2310. The communication interface 2310 may include one of a wireless local area network (LAN) 2311 (for example, Wi-Fi), Bluetooth 2312, and wired Ethernet 2313, according to the performance and structure of the decoding apparatus 2300. Alternatively, the communication interface 2310 may include a combination of the wireless LAN 2311, the Bluetooth 2312, and the wired Ethernet 2313.

The communication interface 2310 according to an embodiment of the disclosure may receive AI encoding data generated as a result of AI encoding. The AI encoding data is data generated as a result of AI down-scaling and first encoding of an original image, and may include image data and AI data.

The processor 2320 according to an embodiment of the disclosure may control the decoding apparatus 2300 in overall. The processor 2320 according to an embodiment of the disclosure may execute one or more programs stored in the memory 2330.

The memory 2330 according to an embodiment of the disclosure may store various types of data, programs, or applications for driving and controlling the decoding apparatus 2300. Also, the memory 2330 may store the AI encoding data received according to an embodiment of the disclosure or a second image obtained via first decoding. The program stored in the memory 2330 may include one or more instructions. The program (one or more instructions) or application stored in the memory 2330 may be executed by the processor 2320.

The processor 2320 according to an embodiment of the disclosure may include a CPU 2321, a GPU 2323, and a video processing unit (VPU) 2322. Alternatively, according to an embodiment of the disclosure, the CPU 2321 may include the GPU 2323 or the VPU 2322. Alternatively, the CPU 2321 may be implemented in a form of a system on chip (SoC) in which at least one of the GPU 2323 or the VPU 2322 is integrated. Alternatively, the GPU 2323 and the VPU 2322 may be integrated.

The processor 2320 may perform a function of controlling overall operations of the decoding apparatus 2300 and a signal flow between internal components of the decoding apparatus 2300, and processing data. The processor 2320 may control the communication interface 2310 and the I/O interface 2340. The GPU 2323 may perform a graphic process and may generate a screen including various objects, such as an icon, an image, and text. The VPU 2322 may perform a process on image data or video data received by the decoding apparatus 2300, and perform various image processes on the image data or video data, such as decoding (for example, first decoding), scaling, noise filtering, frame rate converting, resolution converting, and the like.

The processor 2320 according to an embodiment of the disclosure may perform at least one of operations of the parser 1112, the output interface 1113, and the first decoder 1120 described with reference to FIG. 13 and operations of the parser 1112, the output interface 1113, and the first decoder 1120 described with reference to FIG. 15, or may control at least one of the operations to be performed. Alternatively, the processor 2320 may perform at least one of operations of the VSIF structurer 1620 and EDID obtainer 1630 described with reference to FIG. 18 or may control at least one of the operations to be performed.

For example, the processor 2320 may divide AI encoding data received by the communication interface 2310 into image data and AI data. When the AI data is received in a form of metadata of a header of a video file or metadata of a segment, the processor 2320 may parse the AI encoding data and divide the AI encoding data into the image data and the AI data. For example, when the AI encoding data according to an embodiment of the disclosure is configured in a form of an MP4 file, the processor 2320 may parse a box type of received data configured in the form of the MP4 file to determine whether the data is the image data or the AI data.

Also, when the AI data is received in a form of a bitstream, the AI data may be included in the bitstream in a form of an SEI message, and the processor 2320 may distinguish a payload of the SEI message including the image data and the AI data from the bitstream.

The processor 2320 may control the GPU 2323 or VPU 2322 to reconstruct a second image corresponding to a first image, based on the image data.

The processor 2320 may transmit the second image and the AI data to an external apparatus via the I/O interface 2340. The I/O interface 2340 may transmit or receive video, audio, and supplementary information to the outside of the decoding apparatus 2300 under control of the processor 2320. The I/O interface 2340 may include an HDMI port 2341, a DP 2342, and a USB port 2343. It would be obvious to one of ordinary skill in the art that the configuration and operation of the I/O interface 2340 will be variously implemented according to an embodiment of the disclosure.

For example, when the decoding apparatus 2300 and an AI up-scaling apparatus are connected to each other via the HDMI port 2341, the I/O interface 2340 may receive EDID information of the AI up-scaling apparatus via a DDC. Also, the processor 2320 may parse the EDID information of the AI up-scaling apparatus received via the DDC. The EDID information may include information about AI up-scaling capability of the AI up-scaling apparatus.

The processor 2320 may determine whether to structure the AI data in a form of a VSIF packet, based on the information about the AI up-scaling capability of the AI up-scaling apparatus. For example, when the AI up-scaling apparatus is able to perform AI up-scaling, the processor 2320 may control the AI data to be structured in the form of the VSIF packet, and when the AI up-scaling apparatus is unable to perform AI up-scaling, the processor 2320 may control an operation of structuring the AI data in the form of the VSIF packet to be not performed.

The I/O interface 2340 may structure the AI data in the form of the VSIF packet under the control of the p, and transmit the AI data structured in the VSIF packet and the second image to the AI up-scaling apparatus via a TMDS channel.

The AI data according to an embodiment of the disclosure includes information enabling the second image to be Ai up-scaled. For example, the AI data may include information indicating whether AI up-scaling is applied to the second image, information about a DNN for up-scaling the second image, and the like.

Figure 26:
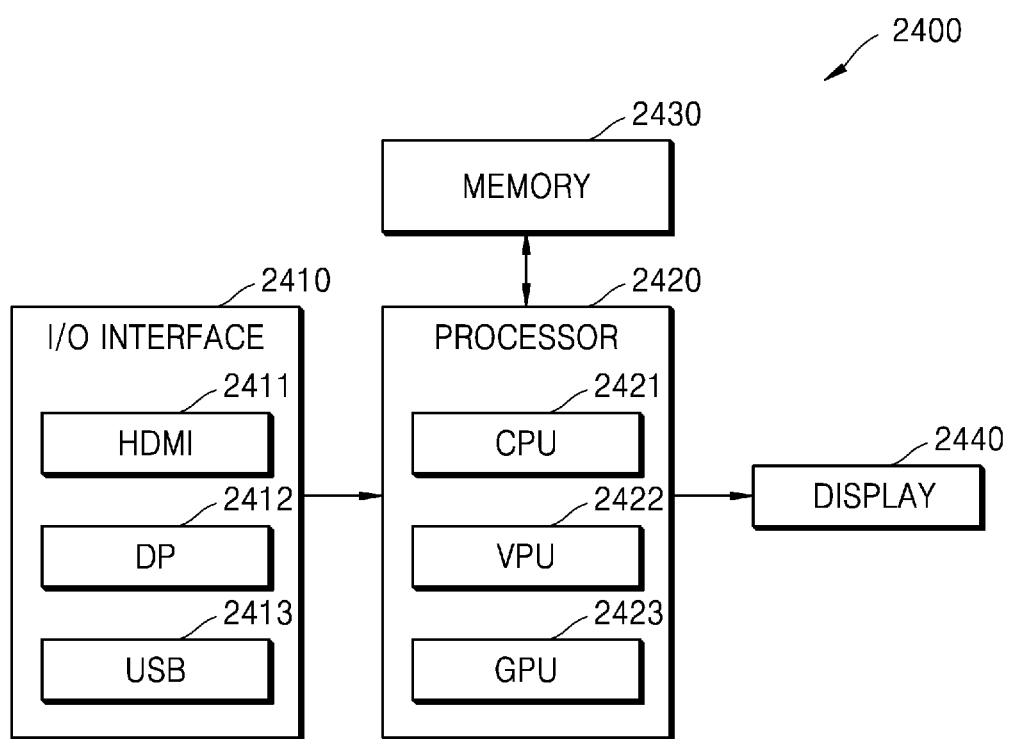
FIG. 26 is a block diagram of a configuration of an AI up-scaling apparatus, according to an embodiment of the disclosure.

FIG. 26 is a block diagram of a configuration of an AI up-scaling apparatus 2400, according to an embodiment of the disclosure.

The AI up-scaling apparatus 2400 of FIG. 26 is an example of the AI up-scaling apparatus 1200 of FIG. 12.

Referring to FIG. 26, the AI up-scaling apparatus 2400 according to an embodiment of the disclosure may include an input/output (I/O) device 2410, a processor 2420, a memory 2430, and a display 2440.

The I/O interface 2410 of FIG. 26 may correspond to the I/O interface 1210 of FIG. 17. Accordingly, descriptions about FIG. 26, which are the same as those described with reference to FIG. 17 will not be provided again.

The I/O interface 2410 according to an embodiment of the disclosure may receive or transmit video, audio, and supplementary information from the outside of the AI up-scaling apparatus 2400 under control of the processor 2420. The I/O interface 2340 may include an HDMI port 2411, a DP 2412, and a USB port 2413. It would be obvious to one of ordinary skill in the art that the configuration and operation of the I/O interface 2410 will be variously implemented according to an embodiment of the disclosure.

For example, when a decoding apparatus and the AI up-scaling apparatus 2400 are connected to each other via the HDMI port 2411, the I/O interface 2410 may transmit EDID information of the AI up-scaling apparatus 2400 to the decoding apparatus upon receiving an EDID information read request via a DDC. Also, the I/O interface 2410 may receive a second image and AI data structured in a form of a VSIF packet via a TMDS channel.

Alternatively, the I/O interface 2410 may receive the second image and the AI data via a DP. However, an embodiment of the disclosure is not limited thereto, and the second image and the AI data may be received via any one of various input and output interfaces. Alternatively, the I/O interface 2410 may receive the second image and the AI data via an input and output interface of another manner.

The processor 2420 according to an embodiment of the disclosure may control the AI up-scaling apparatus 2400 in overall. The processor 2420 according to an embodiment of the disclosure may execute one or more programs stored in the memory 2430.

The memory 2430 according to an embodiment of the disclosure may store various types of data, programs, or applications for driving and controlling the AI up-scaling apparatus 2400. For example, the memory 2430 may store the EDID information of the AI up-scaling apparatus 2400. The EDID information may include various types of information regarding the AI up-scaling apparatus 2400, and in particular, may include information about AI up-scaling capability of the AI up-scaling apparatus 2400. The program stored in the memory 2430 may include one or more instructions. The program (one or more instructions) or application stored in the memory 2430 may be executed by the processor 2420.

The processor 2420 according to an embodiment of the disclosure may include a CPU 2421, a GPU 2423, and a VPU 2422. Alternatively, according to an embodiment of the disclosure, the CPU 2421 may include the GPU 2423 or the VPU 2422. Alternatively, the CPU 2421 may be implemented in a form of an SoC in which at least one of the GPU 2423 or the VPU 2422 is integrated. Alternatively, the GPU 2423 and the VPU 2422 may be integrated. Alternatively, the processor 2420 may further include a neural processing unit (NPU).

The processor 2420 may perform a function of controlling overall operations of the AI up-scaling apparatus 2400 and a signal flow between internal components of the AI up-scaling apparatus 2400, and processing data. The processor 2420 may control the I/O interface 2410 and the display 2440. The GPU 2423 may perform a graphic process and may generate a screen including various objects, such as an icon, an image, and text. The VPU 2422 may perform a process on image data or video data received by the AI up-scaling apparatus 2400, and perform various image processes on the image data or video data, such as decoding (for example, first decoding), scaling, noise filtering, frame rate converting, resolution converting, and the like. The processor 2420 according to an embodiment of the disclosure may perform at least one operation of the AI up-scaler 1230 described above with reference to FIG. 17 or may control the at least one operation to be performed.

For example, the processor 2420 may perform AI up-scaling on the second image, based on whether the AI data is received by the I/O interface 2410.

The processor 2420 may search for the VSIF packet by identifying header information of an HDMI packet received by the I/O interface 2410 When the VSIF packet is found, the processor 2420 may determine whether the AI data is included in the VSIF packet. The AI data may include information indicating whether AI up-scaling is applied to the second image, information about a DNN for up-scaling the second image, and the like.

Also, the processor 2420 may determine whether to perform AI up-scaling on the second image, based on the information indicating whether AI up-scaling is applied to the second image.

The processor 2420 may obtain the information about DNN for up-scaling the second image, based on the AI data, and generate a third image by performing AI up-scaling on the second image by using the DNN determined according to the obtained information. The processor 2420 may control the NPU to perform AI up-scaling on the second image by using the determined DNN.

When the I/O interface 2410 do not receive the AI data, the processor 2420 may generate a fourth image by performing AI up-scaling on the second image according to a pre-set method without using the AI data. Here, the fourth image may have lower image quality than the third image on which AI up-scaling is performed by using the AI data.

The display 2440 generates a driving signal by converting an image signal, data signal, OSD signal, or control signal processed by the processor 2420. The display 2440 may be implemented as a plasma display panel (PDP), a liquid crystal display (LCD), an organic light-emitting diode (OLED), a flexible display or the like, or may be implemented as a 3-dimensional (3D) display. Also, the display 2440 may be configured as a touch screen to be used as an input device in addition to an output device. The display 2440 may display the third image or the fourth image.

Meanwhile, the block diagrams of the decoding apparatus 2300 and the AI up-scaling apparatus 2400 shown in FIGS. 25 and 26 are only examples. The components of the block diagrams may be integrated or omitted, or other components may be added thereto, according to the decoding apparatus 2300 and the AI up-scaling apparatus 2400 that are actually implemented. In other words, when necessary, two or more components may be integrated into one component or one component may be divided into two or more components. Also, a function performed in each block is for describing embodiments of the disclosure, and a specific operation or apparatus does not limit the scope of the disclosure.

A decoding apparatus according to an embodiment of the disclosure may efficiently transmit AI data and a reconstructed image to an AI up-scaling apparatus via an input and output interface.

An AI up-scaling apparatus according to an embodiment of the disclosure may efficiently receive AI data and a reconstructed image from a decoding apparatus via an input and output interface.

Meanwhile, the embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Meanwhile, a model related to the DNN described above may be implemented via a software module. When the DNN model is implemented via a software module (for example, a program module including instructions), the DNN model may be stored in a computer-readable recording medium.

Also, the DNN model may be a part of the AI up-scaling apparatus 1200 described above, by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server. While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic device comprising:
    a communication interface configured to receive artificial intelligence (AI) encoding data, the AI encoding data generated by an AI down-scaling of an original image followed by an encoding;
    one or more processors configured to:
        obtain image data corresponding to an encoding result on a first image from the received AI encoding data;
        obtain AI data related to AI down-scaling the original image to the first image from the received AI encoding data, the AI data comprising a bitrate of the image data or a codec type used in the encoding; and
        obtain a second image by decoding the obtained image data; and
    an input/output (I/O) interface,
    wherein the one or more processors are further configured to:
        control the I/O interface to receive supplementary information from an external apparatus,
        determine, based on the supplementary information, whether an AI up-scaling is possible by the external apparatus, and
        when the AI up-scaling is possible, control the I/O interface to transmit the second image and the AI data to the external apparatus,
    wherein the bitrate of the image data or the codec type are used to select first neural network (NN) setting information from among a plurality of first NN setting information for an up-scaling NN, wherein the external apparatus includes the up-scaling NN,
    wherein the first image is obtained through a down-scaling NN configured with selected second NN setting information from among a plurality of second NN setting information for the AI down-scaling, and
    wherein the plurality of first NN setting information and the plurality of second NN setting information are obtained through joint training of the down-scaling NN and the up-scaling NN.

2. The electronic device of claim 1, wherein the I/O interface comprises a high definition multimedia interface (HDMI), and
    the one or more processors are further configured to transmit the second image and the AI data to the external apparatus through the HDMI.

3. The electronic device of claim 2, wherein the one or more processors are further configured to transmit the AI data in a form of a vendor-specific infoframe (VSIF) packet.

4. The electronic device of claim 1, wherein the I/O interface comprises a display port (DP),
    and the one or more processors are further configured to transmit the second image and the AI data to the external apparatus through the DP.

5. The electronic device of claim 1, wherein the AI data comprises first information indicating that the second image has undergone AI down-scaling.

6. The electronic device of claim 5, wherein the AI data comprises second information related to a neural network (NN) for performing an AI up-scaling of the second image.

7. The electronic device of claim 6, wherein the AI down-scaling has been performed by a first NN, the NN for performing the AI up-scaling is a second NN, the first NN and the second NN are jointly trained based on sharing quality loss information.

8. The electronic device of claim 1, wherein the AI data indicates one or more color channels to which AI upscaling is to be applied.

9. The electronic device of claim 1, wherein the AI data indicates at least one of a high dynamic range (HDR) maximum illumination, HDR color gamut, HDR perceptual quantizer PQ, codec or a rate control type.

10. The electronic device of claim 1, wherein the AI data indicates a width resolution of the original image and a height resolution of the original image.

11. The electronic device of claim 1, wherein the AI data indicates an output bit rate of the first encoding.

12. An operating method of an electronic device, the operating method comprising:
    receiving artificial intelligence (AI) encoding data, the AI encoding data generated by an AI down-scaling of an original image followed by an encoding;
    obtaining image data corresponding to an encoding result on a first image from the received AI encoding data;
    obtaining AI data related to AI down-scaling the original image to the first image from the received AI encoding data, the AI data comprising a bitrate of the image data or a codec type used in the encoding;
    obtaining a second image by decoding the obtained image data;
    controlling the I/O interface to receive supplementary information from an external apparatus;
    determining, based on the supplementary information, whether an AI up-scaling is possible by the external apparatus; and
    when the AI up-scaling is possible, transmitting the second image and the AI data to the external apparatus through an input/output (I/O) interface,
    wherein the bitrate of the image data or the codec type are used to select first neural network (NN) setting information from among a plurality of first NN setting information for an up-scaling NN, wherein the external apparatus includes the up-scaling NN, wherein the first image is obtained through a down-scaling NN configured with selected second NN setting information from among a plurality of second NN setting information for the AI down-scaling, and wherein the plurality of first NN setting information and the plurality of second NN setting information are obtained through joint training of the down-scaling NN and the up-scaling NN.

13. The operating method of claim 12, wherein the transmitting of the second image and the AI data to the external apparatus comprises transmitting the second image and the AI data to the external apparatus through a high definition multimedia interface (HDMI).

14. The operating method of claim 13, wherein the transmitting of the second image and the AI data to the external apparatus comprises transmitting the AI data in a form of a vendor-specific infoframe (VSIF) packet.

15. The operating method of claim 12, wherein the transmitting of the second image and the AI data to the external apparatus comprises transmitting the second image and the AI data to the external apparatus through a display port (DP).

16. The operating method of claim 12, wherein the AI data comprises first information indicating that the second image has undergone AI down-scaling.

17. The operating method of claim 16, wherein the AI data comprises second information related to a neural network (NN) for performing an AI up-scaling of the second image.

18. The operating method of claim 17, wherein the AI down-scaling has been performed by a first NN, the NN for performing the AI up-scaling is a second NN, the first NN and the second NN are jointly trained based on sharing quality loss information.

19. The operating method of claim 12, wherein the AI data indicates one or more color channels to which AI upscaling is to be applied.

20. The operating method of claim 12, wherein the AI data indicates at least one of a high dynamic range (HDR) maximum illumination, HDR color gamut, HDR perceptual quantizer PQ, codec or a rate control type.

21. The operating method of claim 12, wherein the AI data indicates a width resolution of the original image and a height resolution of the original image.

22. The operating method of claim 12, wherein the AI data indicates an output bit rate of the first encoding.

* * * * *